United States Patent
Huang et al.

(10) Patent No.: US 10,650,819 B2
(45) Date of Patent: May 12, 2020

(54) SYSTEM AND METHOD FOR PROVIDING PORTABLE NATURAL LANGUAGE PROCESSING INTERFACE ACROSS MULTIPLE APPLIANCES

(71) Applicant: MIDEA GROUP CO., LTD., Foshan (CN)

(72) Inventors: Haibin Huang, San Jose, CA (US); Chen Zhang, San Jose, CA (US); Xin Liu, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 31 days.

(21) Appl. No.: 16/160,929

(22) Filed: Oct. 15, 2018

(65) Prior Publication Data
US 2020/0118559 A1    Apr. 16, 2020

(51) Int. Cl.
*G10L 15/22*     (2006.01)
*G10L 15/30*     (2013.01)
(Continued)

(52) U.S. Cl.
CPC ............ *G10L 15/22* (2013.01); *G10L 15/063* (2013.01); *G10L 15/1815* (2013.01);
(Continued)

(58) Field of Classification Search
CPC .................................................... G10L 15/22
(Continued)

(56) References Cited

U.S. PATENT DOCUMENTS 7,409,337 B1 *  8/2008  Potter ................. G06F 17/2735
                                                              704/9
2012/0046952 A1   2/2012  Hsu et al.
(Continued)

FOREIGN PATENT DOCUMENTS

CN           203870416 U      10/2014
CN           204650175 U       9/2015
(Continued)

OTHER PUBLICATIONS

Midea Group Co Ltd., International Search Report and Written Opinion, PCT/CN2019/078929, dated Jul. 16, 2019, 9 pgs.
(Continued)

*Primary Examiner* — Paras D Shah
*Assistant Examiner* — Timothy Nguyen
(74) *Attorney, Agent, or Firm* — Morgan, Lewis & Bockius LLP

(57) ABSTRACT

A method and system of providing a portable voice-based control user interface for multiple types of appliances are disclosed. The method includes activating a built-in voice communication interface of a voice control apparatus; selecting a first target appliance to receive voice-based commands; receiving a first voice input; in accordance with a determination that the first target appliance is a first appliance of a first appliance type, processing the first voice input using a first NLP model corresponding to the first appliance type to obtain a first machine command, and sending the first machine command to the first appliance; and in accordance with a determination that the first target appliance is a second appliance of a second appliance type, processing the first voice input using a second NLP model corresponding to the second appliance type to obtain a second machine command, and sending the second machine command to the second appliance.

20 Claims, 19 Drawing Sheets

(51) Int. Cl.
*G10L 15/18* (2013.01)
*G10L 15/06* (2013.01)

(52) U.S. Cl.
CPC ...... *G10L 15/30* (2013.01); *G10L 2015/0635* (2013.01); *G10L 2015/223* (2013.01)

(58) Field of Classification Search
USPC ......................................................... 704/244
See application file for complete search history.

(56) References Cited

U.S. PATENT DOCUMENTS

| | | | | |
|---|---|---|---|---|
| 2013/0183944 A1* | 7/2013 | Mozer | ................... | H04L 12/282 455/414.1 |
| 2014/0039888 A1* | 2/2014 | Taubman | .......... | H04M 1/72572 704/235 |
| 2016/0111091 A1* | 4/2016 | Bakish | ................... | G10L 15/30 704/275 |
| 2016/0379630 A1* | 12/2016 | Assayag | ................. | G10L 15/22 704/235 |
| 2017/0032783 A1* | 2/2017 | Lord | ....................... | G10L 15/22 |
| 2019/0214009 A1* | 7/2019 | An | ........................ | H04L 12/282 |
| 2019/0279618 A1* | 9/2019 | Yadav | ..................... | G06F 17/27 |

FOREIGN PATENT DOCUMENTS

| | | |
|---|---|---|
| CN | 106791160 A | 5/2017 |
| CN | 106886166 A | 6/2017 |
| CN | 108170034 A | 6/2018 |

OTHER PUBLICATIONS

Midea Group Co. Ltd., International Search Report and Written Opinion, PCT/CN2019/078930, dated Jul. 15, 2019, 9 pgs.

* cited by examiner

400

402 At a voice control apparatus having one or more processors, memory, a built-in data communication interface that is configured to establish data communication with multiple types of appliances configured to respond to distinct sets of machine commands to perform their respective appliance operations, a built-in voice communication interface that is configured to accept voice-based inputs from a user, and a built-in natural-language processing (NLP) module stored in the memory of the voice control apparatus, wherein the NLP module includes a respective NLP model for each of the multiple types of appliances:

404 Detecting a user request to activate the built-in voice communication interface of the voice control apparatus.

406 In response to detecting the user request to activate the built-in voice communication interface of the voice control apparatus:

408 Activating the built-in voice communication interface of the voice control apparatus.

410 In accordance with one or more target selection criteria, selecting a first target appliance for one or more voice-based commands that are to be received through the built-in voice communication interface of the voice control apparatus.

412 While the built-in voice communication interface remains activated and a current selection of the first target appliance remains unchanged, receiving a first voice input through the built-in voice communication interface of the voice control apparatus.

414 In response to receiving the first voice input:

416 In accordance with a determination that the first target appliance is a first appliance of a first appliance type, processing the first voice input using a first NLP model of the built-in NLP module that corresponds to the first appliance type to obtain a first machine command, and sending, via the built-in data communication interface, the first machine command to the first appliance.

418 In accordance with a determination that the first target appliance is a second appliance of a second appliance type that is distinct from the first appliance type, processing the first voice input using a second NLP model of the built-in NLP module that corresponds to the second appliance type to obtain a second machine command, and sending, via the built-in data communication interface, the second machine command to the second appliance.

Figure 4

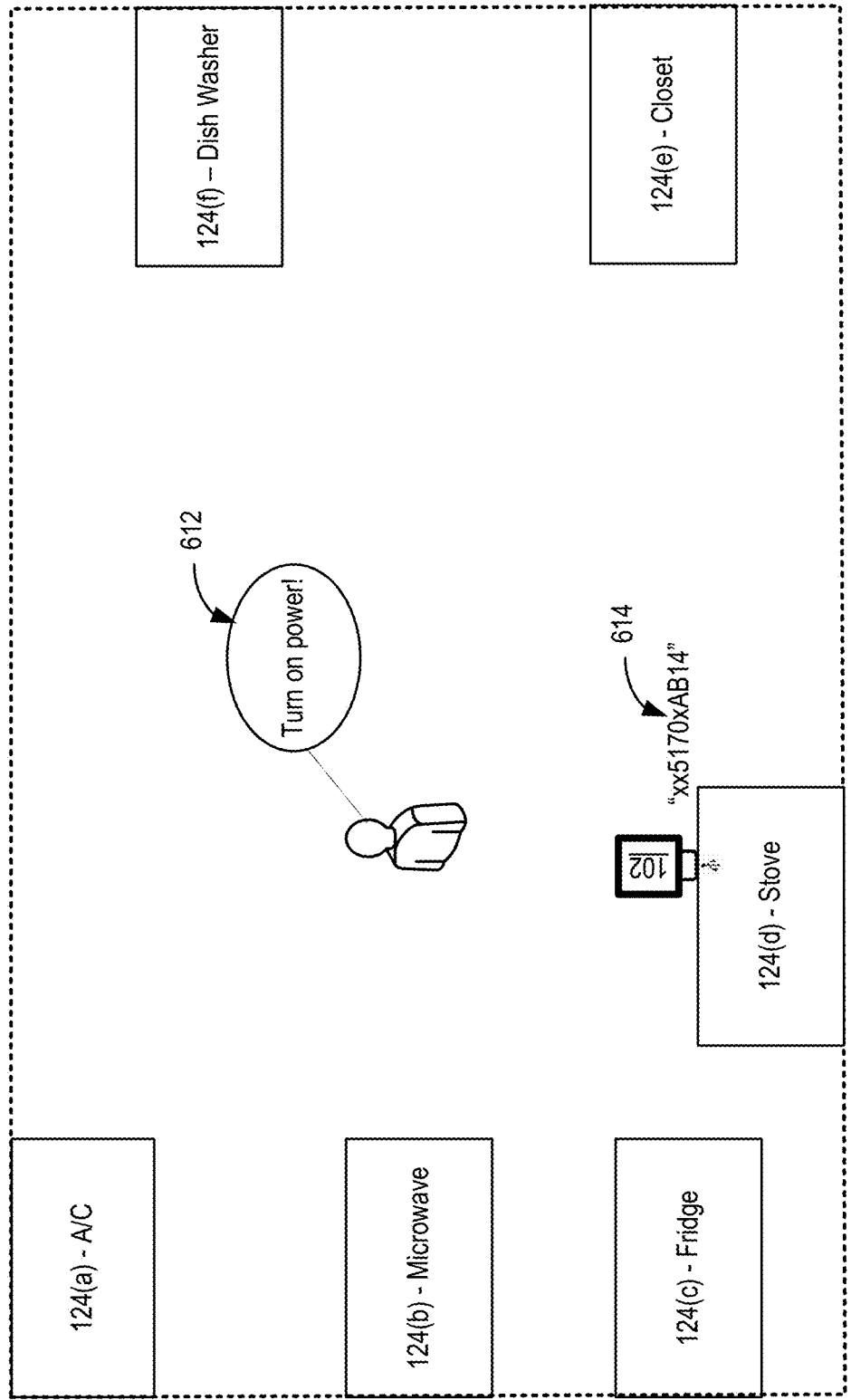

700

702 Establishing a data communication connection with a voice control apparatus, the voice control apparatus has a built-in data communication interface that is configured to establish data communication with multiple types of appliances configured to respond to distinct sets of machine commands to perform their respective appliance operations, a built-in voice communication interface that is configured to accept voice-based inputs from a user, and a built-in natural-language processing (NLP) module stored in the memory of the voice control apparatus, wherein the NLP module is configured to store multiple NLP models and selectively utilize a respective one of the multiple NLP models in accordance with a specified target appliance for a currently received voice input.

704 Detecting a first user request to update the NLP module of the voice-control apparatus.

706 In response to detecting the first user request to update the NLP module of the voice-control apparatus:

708 Establishing a connection to a NLP model server corresponding to the voice-control apparatus.

710 Displaying, on the display, a listing of appliance types and a respective listing of appliance functions for each appliance type, in a graphical user interface.

712 Receiving user selection of a first set of appliance functions for a first appliance type and a second set of appliance functions for a second appliance type, displayed in the graphical user interface.

714 In response to receiving the user selection of the first set of appliance functions for the first appliance type and the second set of appliance functions for the second appliance type:

716 Downloading, from the NLP model server, a first NLP model that is trained on voice commands for the first set of appliance functions for the first appliance type, and a second NLP model that is trained on voice commands for the second set of appliance functions for the second appliance type.

718 Integrating the downloaded first NLP model and second NLP model into the NLP module of the voice-control apparatus.

Figure 7

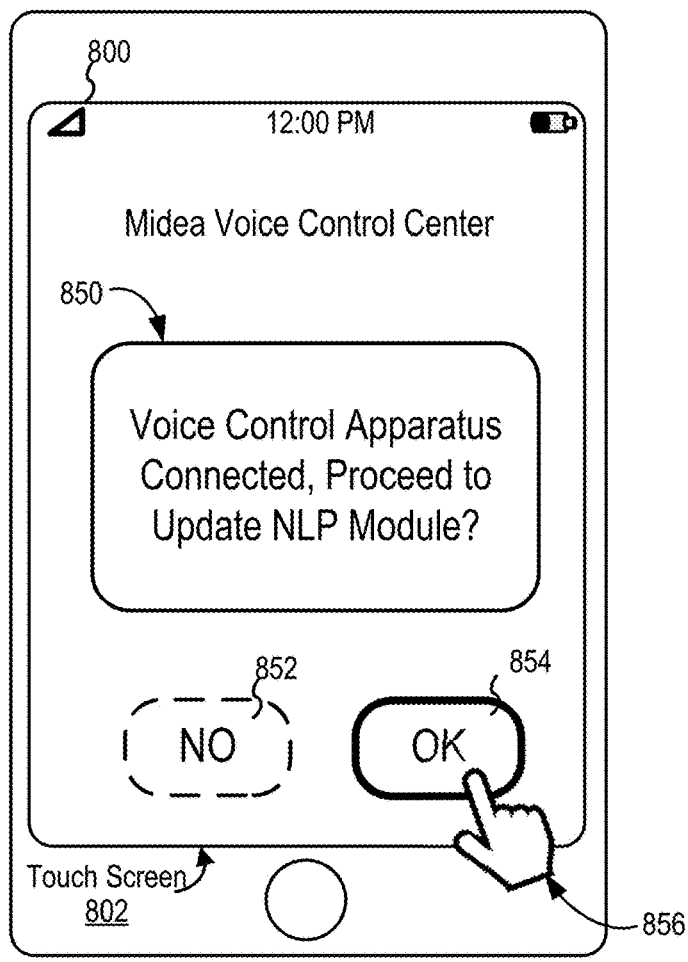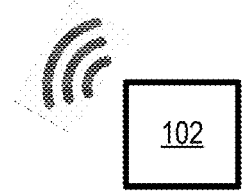
Figure 8D

User Device 202
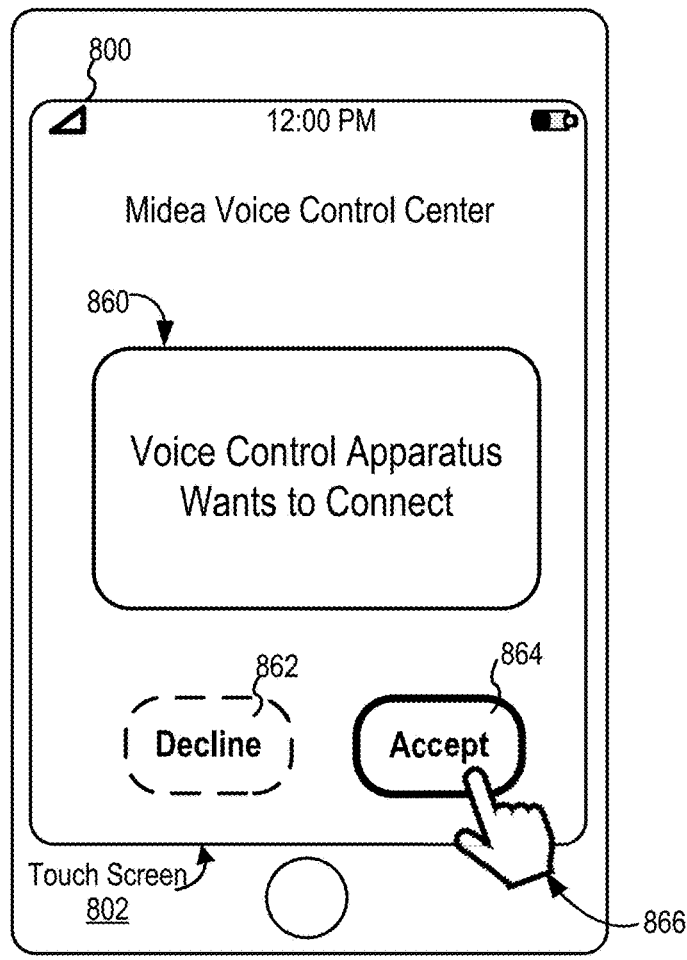
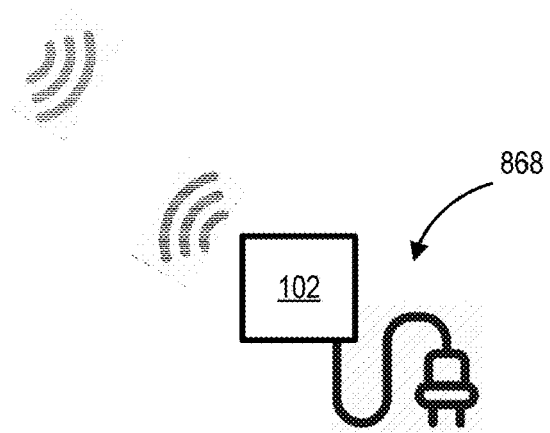
Figure 8E

SYSTEM AND METHOD FOR PROVIDING PORTABLE NATURAL LANGUAGE PROCESSING INTERFACE ACROSS MULTIPLE APPLIANCES

FIELD OF THE TECHNOLOGY

The present disclosure relates to the field of voice-based user interface for controlling appliances, and in particular, to a method and system for providing portable natural language processing (NLP) interface across multiple appliances.

BACKGROUND OF THE TECHNOLOGY

Recently, voice-based digital assistants, such as Apple's SIRI, Amazon's Echo, Google's Google Assistant, and Microsoft's Cortana, have been introduced into the marketplace to handle various tasks such as home appliance controls, web search, calendaring, reminders, etc. One advantage of such voice-based digital assistants is that users can interact with an appliance in a hands-free manner without handling or even looking at the appliance. Conventionally, to initiate the voice-based digital assistant, users speak a trigger phase (e.g., a predefined wake-up word or command) to the voice-based digital assistant, or interacts with a user device (e.g., by opening an application on a smartphone and pressing virtual buttons on the user interface) that is coupled to control the voice-based digital assistant. The voice-based digital assistant interprets the voice command it receives after it has been activated, and performs an action (e.g., providing an informational answer and/or sending an encoded instruction to control a peripheral device, such as an appliance in a smart home environment).

However, controlling multiple appliances using conventional voice-based digital assistants pose many limitations. For example, conventional voice-based digital assistants are not power efficient because they require constant listening to speech command in the environment. Conventional voice-based digital assistants also require connection to the internet to access a server for complex and powerful natural language processing (NLP). However, internet accessibility not only requires certain hardware and software integrated on the digital assistants, but also brings privacy concerns to the user. Further, conventional voice-based digital assistants work with complex NLP models that are capable of handling a wide range of speech command. However, such complex NLP models are difficult and time-consuming to train and upgrade, and the accuracy and efficiency of using such complex NLP models are compromised. Moreover, conventional voice-based digital assistants do not provide sufficient mobility to accommodate user's needs to control multiple appliances while doing all kinds of activities at various locations within a certain environment (e.g., at home). Even if a user device (e.g., a smartphone) can be used to control the voice-based digital assistant, the user still has to interact with the user device to send command to the voice-based digital assistant, which is inconvenient and inefficient especially when the user is engaged in various activities. In addition, conventional voice-based digital assistants are proprietary and may be used only with appliances of expensive high-end models and/or appliances made by designated manufacturer(s).

Thus, it would be beneficial to provide portable NLP interface to improve the way that multiple appliances are controlled.

SUMMARY

Accordingly, there is a need for a method and system to control multiple appliances (and/or other devices) using a portable voice control apparatus (e.g., a portable NLP interface, a portable NLP apparatus) that is low cost and low power consumption. The voice control apparatus does not need to connect to a server or the internet for complex NLP processing. In addition, the voice control apparatus is customizable to each individual user's needs, and adaptable to multiple types of appliances of different models and/or different manufacturers.

The embodiments described below provide systems and methods for controlling multiple appliances through a voice control apparatus that has a built-in voice communication interface, a built-in data communication interface, and a built-in natural-language processing (NLP) module including a plurality of NLP models, where a respective NLP model is used for each of the multiple appliances. The voice control apparatus does not constantly listen to voice command. Instead, the built-in voice communication interface is activated by a predefined triggering event as disclosed herein to start listening to voice command from the user. As such, the voice control apparatus as disclosed herein can be made small, portable, and low power consumption. Further, the voice control apparatus can determine what target appliance is selected to be controlled via the voice command, and the corresponding NLP model is used to process the received voice command to obtain machine command for controlling the selected target appliance. The NLP module of the voice control apparatus is easy to customize, upgrade, and adapt to different appliance types. For example, the voice control apparatus can store one or more NLP models corresponding to one or more appliance types that are owned and/or commonly used by the user within an environment (e.g., at home). Moreover, each individual NLP model can be customized according to user's commonly used and/or preferred functions of an appliance of the corresponding appliance type. As such, the voice control apparatus as disclosed herein does not need to work with complex NLP models operated by a server. Instead, the voice control apparatus is lightweight, customizable, and can work completely offline from the internet, ensuring that the voice control apparatus can efficiently and accurately process user's voice command to control appliances while protecting user's privacy and reducing the cost spent on implementing device security measures. Further, by using a user device as the intermediary between the voice control apparatus and a server (e.g., an NLP server), the voice control apparatus does not need its own graphical user interface (e.g., no display or touch sensitive pad is required on the voice control apparatus).

As disclosed herein, in some embodiments, a method of providing a portable voice-based control user interface for multiple types of appliances, including: at a voice control apparatus having one or more processors, memory, a built-in data communication interface that is configured to establish data communication with multiple types of appliances configured to respond to distinct sets of machine commands to perform their respective appliance operations, a built-in voice communication interface that is configured to accept voice-based inputs from a user, and a built-in natural-language processing (NLP) module stored in the memory of the voice control apparatus, wherein the NLP module includes a respective NLP model for each of the multiple types of appliances: detecting a user request to activate the built-in voice communication interface of the voice control apparatus; in response to detecting the user request to activate the built-in voice communication interface of the voice control apparatus: activating the built-in voice communication interface of the voice control apparatus; and in accordance with one or more target selection criteria, selecting a first target appliance for one or more voice-based commands that are to be received through the built-in voice communication interface of the voice control apparatus; while the built-in voice communication interface remains activated and a current selection of the first target appliance remains unchanged, receiving a first voice input through the built-in voice communication interface of the voice control apparatus; in response to receiving the first voice input: in accordance with a determination that the first target appliance is a first appliance of a first appliance type, processing the first voice input using a first NLP model of the built-in NLP module that corresponds to the first appliance type to obtain a first machine command, and sending, via the built-in data communication interface, the first machine command to the first appliance; and in accordance with a determination that the first target appliance is a second appliance of a second appliance type that is distinct from the first appliance type, processing the first voice input using a second NLP model of the built-in NLP module that corresponds to the second appliance type to obtain a second machine command, and sending, via the built-in data communication interface, the second machine command to the second appliance.

In accordance with some embodiments, a voice control apparatus includes a built-in voice communication interface configured to accept voice-based inputs from a user, a built-in data communication interface configured to establish data communication with multiple types of appliances configured to respond to distinct sets of machine commands to perform their respective appliance operations, a built-in natural-language processing (NLP) module stored in memory of the voice control apparatus, wherein the NLP module includes a respective NLP model for each of the multiple types of appliances, one or more processors, and memory storing instruction, the instructions, when executed by the one or more processors, cause the processors to perform operations of any of the methods described herein. In accordance with some embodiments, a voice control apparatus is provided that comprises means for performing any of the methods described herein. In accordance with some embodiments, a computer-readable storage medium (e.g., a non-transitory computer readable storage medium) is provided, the computer-readable storage medium storing one or more programs for execution by one or more processors of a voice control apparatus, the one or more programs including instructions for performing any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 4 is a flowchart diagram of a method of providing a voice-based control user interface for multiple types of appliances in accordance with some embodiments.

FIGS. 5A-5C, 5D-1, 5D-2, 5E-1, and 5E-2 are block diagrams illustrating various embodiments of activating a voice communication interface of a voice control apparatus in accordance with some embodiments.

FIGS. 6A-6B are block diagrams illustrating various operating scenarios of using a voice control apparatus for controlling multiple types of appliances in accordance with some embodiments.

FIG. 7 is a flowchart diagram of a method of customizing a portable voice-based control user interface for multiple types of appliances in accordance with some embodiments.

FIGS. 8A-8G illustrate examples of systems and user interfaces for customizing a portable voice-based control user interface for multiple types of appliances in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
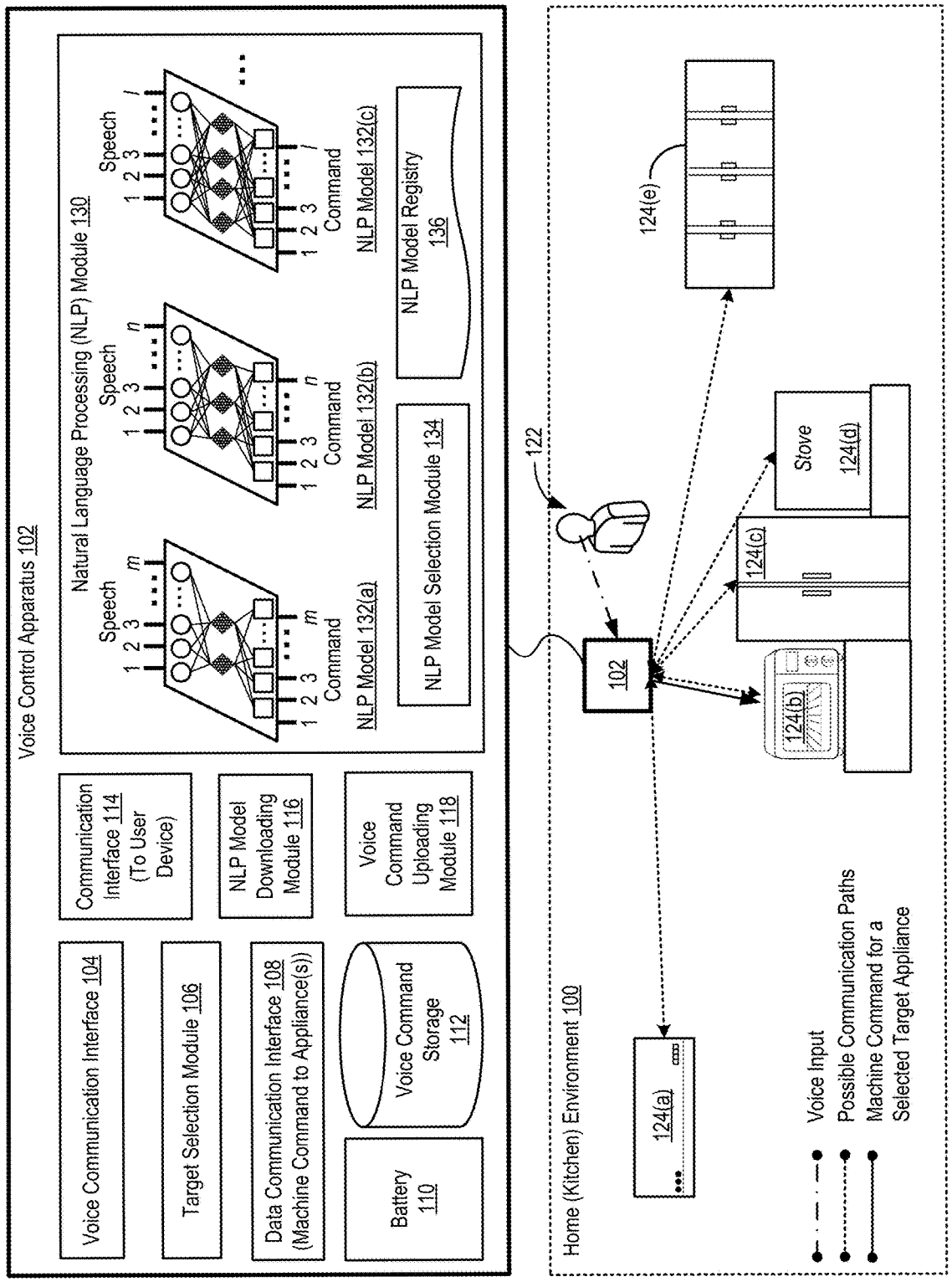
FIG. 1 is a block diagram illustrating an operating environment including multiple appliances that are controllable by a voice control apparatus in accordance with some embodiments.

FIG. 1 is a block diagram illustrating an operating environment 100 including multiple appliances 124 that are controllable by a voice control apparatus 102 in accordance with some embodiments. In some embodiments, the operating environment 100 is a home environment, such as a kitchen at home. In some embodiments, the home environment 100 includes a first home appliance, e.g., an air conditioner 124(a) that is located on a wall of the kitchen near the ceiling. In some embodiments, the home environment 100 further includes a second home appliance, e.g., a refrigerator 124(c), that is located between two other home appliances, e.g., an oven 124(d) and a microwave oven 124(b), all of the three appliances are placed within the kitchen. In some embodiments, the home environment 100 also includes storage cabinets 124(e) mounted on a wall of the kitchen.

In some embodiments, the voice control apparatus 102 includes a built-in voice communication interface 104 that may include a built-in microphone or any other voice recording device to collect audio data including voice inputs from the environment, and speech recognition module to recognize voice command from the collected audio data. In some embodiments, unlike the conventional voice-based digital assistants, the voice communication interface 104 is not constantly active to listen to user's voice command. Rather, the voice communication interface 104 can be activated in accordance with a predefined triggering event, such as detecting a button being pressed on the voice control apparatus 102, detecting that the voice control apparatus 102 is turned to a particular orientation, a communication interface (e.g., data communication interface 108 to appliance(s) or communication interface 114 to the user device) is activated, or physically coupling (e.g., attaching) the voice control apparatus 102 to an appliance 124. Once activated, the voice communication interface 104 is configured to receive voice command (e.g., voice-based inputs, voice input) from a user 122 for controlling one or more appliances 124 within the operating environment 100.

In some embodiments, the voice control apparatus 102 is capable of communicating with different types of appliances in the kitchen, as shown as "Possible Communication Paths" in dashed lines in FIG. 1. In some embodiments, only one appliance is selected in every control session. In some embodiments, one control session corresponds to when the voice communication interface 104 of the voice control apparatus 102 is activated, and an appliance (e.g., microwave oven 124(b)) is selected to be controlled by the voice control apparatus 102 and remained unchanged in the current session, as shown as "Machine Command for a Selected Target Appliance" in the solid line in FIG. 1. In some embodiments, the voice control apparatus 102 includes a target selection module 106 configured to select a target appliance to be controlled by user's voice command processed by the voice control apparatus 102. Having the voice control apparatus 102 communicate with one appliance per session can reduce confusion among different appliances and improve efficiency of processing voice command into machine command at the voice control apparatus 102. This is because different appliances may have identical voice command, or identical voice command may correspond to different operations in different appliances. For example, the user's voice input "power on" can correspond to turning on the power for the microwave oven 124(b) or turning on the power for the stove 124(d). In another example, "turn on the fan" can correspond to turning on the fan mode of the A/C 124(a), or turning on the ventilation fan of the stove 124(d). Thus it is necessary to figure out which appliance is selected to be under control (e.g., the target appliance, microwave oven 124(b) in FIG. 1) in the current session, so that the voice control apparatus 102 can translate the voice command into the corresponding machine command, and send the machine command via a data communication interface 108 of the voice control apparatus 102 to the target appliance to effectively and accurately perform the user requested operation.

In some embodiments, the voice control apparatus 102 includes a natural language processing (NLP) module 130 including a plurality of NLP models 132 corresponding to a plurality of types of appliances respectively. In some embodiments, a respective NLP model is configured to process voice command to obtain machine command for a corresponding appliance to perform an operation as required by the voice command. In some embodiments, the same voice command may be processed by different NLP models to obtain different machine command for different appliances. In some embodiments, a respective NLP model in the voice control apparatus 102 is a template-based model, or a state machine, that can be used to process a number of voice commands corresponding to the same number of predetermined operations associated with the corresponding appliance, to obtain the same number of machine commands that are readable by the corresponding appliance to perform the respective predetermined operations. Since the number of commands relevant to a particular appliance is limited, the NLP module 130 including the NLP models 132 has a small footprint and high recognition accuracy. Even if multiple NLP models 132 are included in the voice control apparatus 102, the voice control apparatus 102 can still perform all NLP processing locally without excessive memory usage or support from a server. In some embodiments, the NLP module 130 includes a NLP model registry 136 that stores identifiers of the multiple NLP models 132 stored at the voice control apparatus 102 respectively in association with identifiers of multiple appliance types. In some embodiments, the NLP module 130 includes a NLP model selection module 134 configured to select a NLP model 132 to process voice command for the selected target appliance in accordance with the stored relationship in the NLP model registry 136.

In some embodiments, the voice control apparatus 102 includes the data communication interface 108 for transmitting machine command to one or more appliances. In some embodiments, the data communication interface 108 exchanges data (e.g., machine command or other types of messages) with only one appliance (e.g., the selected target appliance) during one session. For example, after the target selection module 106 determines the target appliance for the current session, the data communication interface 108 (e.g., a sub-interface) directed to communicating with the selected target appliance is activated. In some embodiments, the data communication interface 108 is capable of exchanging data with more than one appliance (and/or device). However, the data communication interface 108 is configured to communicate with only one target appliance during one control session. In some embodiments, the data communication interface 108 includes hardware (e.g., antennas, chips, connectors, etc.) and/or software (e.g., communication protocols, etc.). In some embodiments, the data communication interface 108 supports one or more communication methods including a wireless data communication, such as Bluetooth, Wireless Fidelity (Wi-Fi), near-field communication (NFC), or ZigBee, or a connector-based data communication, such as USB connection. In some embodiments, the voice control apparatus 102 includes the communication interface 114 configured to exchange data (e.g., voice command data, NLP model(s), etc.) with a user device (e.g., the user device 202, FIG. 2). In some embodiments, the communication interface 114 supports one or more communication methods including a wireless data communication, such as Bluetooth, Wireless Fidelity (Wi-Fi), near-field communication (NFC), or ZigBee, or a connector-based data communication, such as USB connection.

In some embodiments, the voice control apparatus 102 includes a NLP model downloading module 116 configured to download one or more NLP models from the user device 202 to be integrated into the NLP module 130, in accordance with user selection from appliance types and user selection of appliance functions for each selected appliance type. In some embodiments, the voice control apparatus 102 includes a voice command storage 112 configured to store voice command data collected from user's voice inputs for controlling functions of one or more appliances respectively. In some embodiments, the voice control apparatus 102 includes a voice command uploading module 118 configured to upload the voice command data from the voice command storage 112 to the user device 202 for updating corresponding NLP models respectively.

In some embodiments, the voice control apparatus 102 includes a battery 110 configured to power various functions of the voice control apparatus 102. The functions include, but are not limited to, activating the voice communication interface 104, selecting a target appliance by the target selection module 106, receiving voice input by the voice communication interface 104, processing the voice input to obtain corresponding machine command for the target appliance using the NLP module 130, sending the obtained machine command via the data communication interface 108, communicating with a user device (e.g., user device 202, FIG. 2) via a communication interface 114 to the user device 202, downloading NLP models from the user device 202 via the NLP model downloading module 116, storing voice command received from the user 122 in the voice command storage 112 as training samples for updating NLP models of the voice control apparatus 102, and uploading the voice command from the voice command storage 112 by the voice command uploading module 118 to the user device 202. In some embodiments, the voice control apparatus 102 can charge the battery 110 when it is connected to a power source, or when it is coupled to an appliance that is connected to a power source. In some embodiments, the voice control apparatus 102 does not include a display, a user-interactive display, or a touch-sensitive pad. In some embodiments, the voice control apparatus 102 may include one or more indicators to visually indicate to the user the currently selected target appliance.

Figure 2:
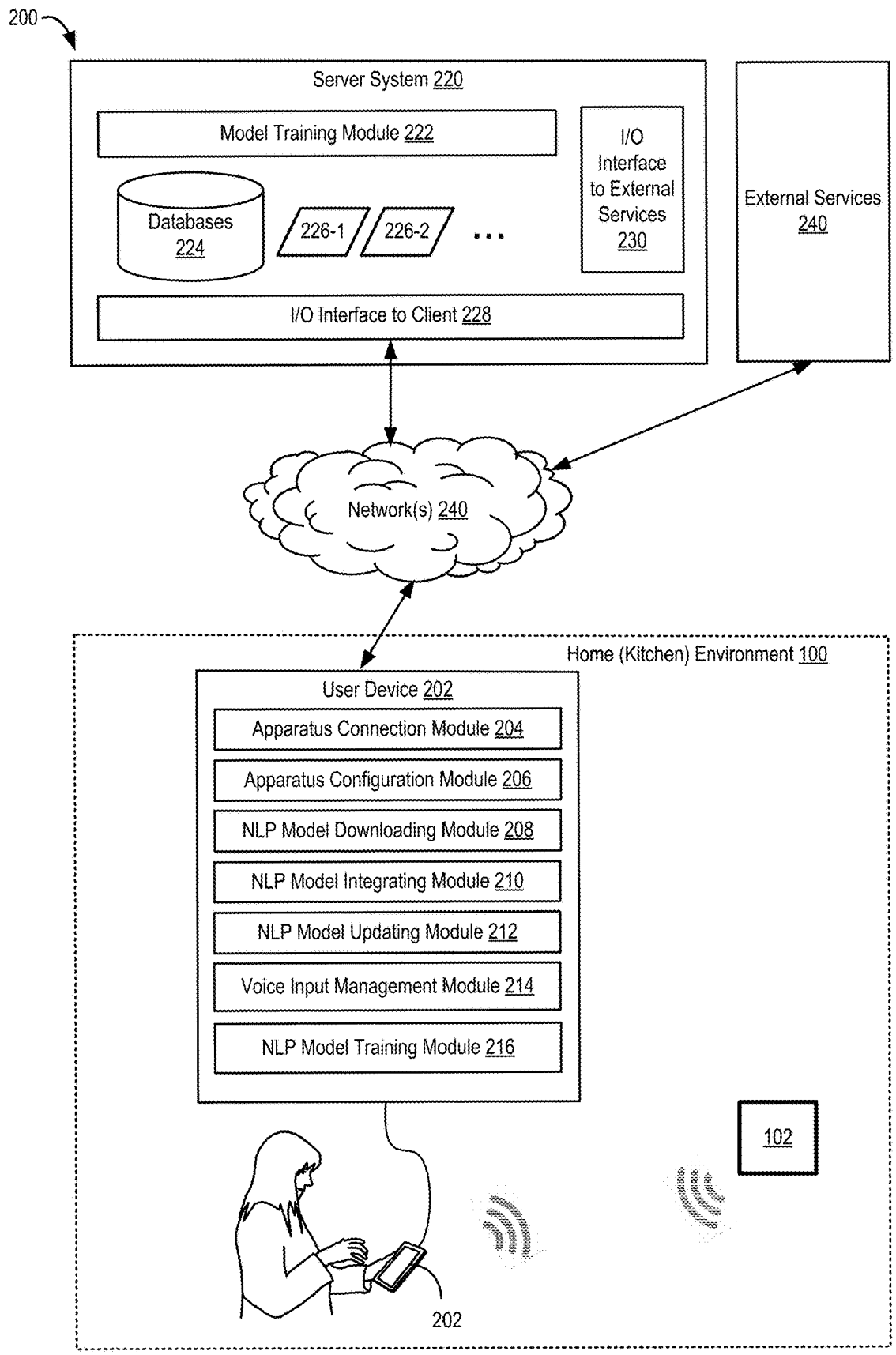
FIG. 2 is a block diagram illustrating a network configuration in which a voice control apparatus operates with a user device for customizing the voice control apparatus in accordance with some embodiments.

FIG. 2 is a block diagram illustrating a network configuration 200 in which the voice control apparatus 102 operates with a user device 202 for customizing the voice control apparatus 102 in accordance with some embodiments. In some embodiments, the network configuration 200 is optionally implemented according to a client-server model. In some embodiments, the network configuration 200 includes the voice control apparatus 102 and the user device 202 that operate in a home environment 100 (e.g., a kitchen environment as shown in FIG. 1) and a server system 220 communicatively coupled with the home environment 100 via cloud networks 240. In some embodiments as discussed in FIG. 1, the home environment 100 includes one or more home appliances 124 (not shown in FIG. 2). In some embodiments, the client-side environment 100 (e.g., the home environment 100) further includes a user device 202 (e.g., a smartphone, a tablet, a personal computer, or a central communication hub).

In some embodiments, the server system 220 includes one or more processing modules, such as model training module 222, data and models stored in databases 224, an I/O interface to client 228, and an I/O interface to external services 230. In some embodiments, the client-facing I/O interface 228 facilitates the client-facing input and output processing for the server system 220. For example, the server system 220 optionally provides the model training services for one or more appliance types based on voice command data related to one or more functions for each respective appliance type. The database and models 224 include voice command from one or more users, including the user 122, and user data for each user and/or household of users, such as individual user's account data (e.g., images, age, gender, characteristics, etc.), and user interface configuration preferences and restrictions, etc. In some embodiments, the model training module 222 utilize the data and models from the databases 224 to train NLP models for the appliance types respectively.

In some embodiments, the server system 220 also communicates with external services 240 (e.g., appliance manufacturer service(s), home appliance control service(s), navigation service(s), messaging service(s), information service(s), calendar services, social networking service(s), etc.) through the network(s) 240 for task completion or information acquisition. The I/O interface to the external services 230 facilitates such communications.

In some embodiments, the server system 220 can be implemented on at least one data processing apparatus and/or a distributed network of computers. In some embodiments, the server system 220 also employs various virtual devices and/or services of third party service providers (e.g., third-party cloud service providers) to provide the underlying computing resources and/or infrastructure resources of the server system 220.

Examples of the communication network(s) 240 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Examples of the user device 202 include, but are not limited to, a cellular telephone, a smart phone, a handheld computer, a wearable computing device (e.g., a HMD), a personal digital assistant (PDA), a tablet computer, a laptop computer, a desktop computer, an enhanced general packet radio service (EGPRS) mobile phone, a media player, a navigation device, a game console, a television, a remote control, a point of sale (POS) terminal, vehicle-mounted computer, an e-book reader, an on-site computer kiosk, a mobile sales robot, a humanoid robot, or a combination of any two or more of these data processing devices or other data processing devices.

As discussed with reference to FIGS. 2 and 9B, a respective user device 202 can include one or more client-side modules that perform similar functions as those discussed in server-side modules of the server system 220. The respective user device 202 can also include one or more databases storing various types of data that are similar to the databases 224 of the server system 220.

In some embodiments, the user device 202 includes, among other modules not shown in FIG. 2, apparatus connection module 204 that is configured to connect to the voice control apparatus 102 (e.g., either wirelessly or through a connector-based connection). In some embodiments, the user device 202 further includes an apparatus configuration module 206 configured to perform an initial configuration to the voice control apparatus 102. For example, the user can select one or more appliances, and one or more functions for each appliance according to the user's need and/or preference to customize the voice control apparatus 102 for his or her own household. In some embodiments, the user device 202 includes a NLP model downloading module 208 configured to download one or more NLP models according to the user's selection from the server system 220. In some embodiments, the user device 202 also includes a NLP model integrating module 210 configured to integrate the downloaded NLP models to the NLP module 130 of the voice control apparatus 102. In some embodiments, the user device 202 includes a NLP model updating module 212 configured to update (e.g., customize) NLP models in accordance with user's voice command collected in the voice control apparatus 102. For example, the NLP model updating module 212 can determine respective weights of the model function, and adjust respective weights of an existing model function based on the collected user's voice command samples. In some embodiments, the user device 202 includes a voice input management module 214 configured to retrieve the user's voice command data for controlling one or more appliances from the voice control apparatus 102, and to upload such voice command data to the server system 220 for training and/or updating the NLP models. In some embodiments, the user device 202 includes a NLP model training module 216 configured to train NLP models. In some embodiments, the NLP model training module 216 of the user device 202 is similar to the model training module 222 of the server system 220.

In some embodiments, the NLP model training and updating and user interface configuration for customizing the voice control apparatus disclosed herein are provided remotely by the server 220, or locally by the user device 202, and/or jointly through a cooperation between the server system 220 and the user device 202, as described herein.

The above examples are provided merely for illustrative purposes. More details of the functions of the voice control apparatus 102 and the user device 202 are set forth below with respect to the flowchart shown in FIG. 4 and FIG. 7 respectively.

Figure 3:
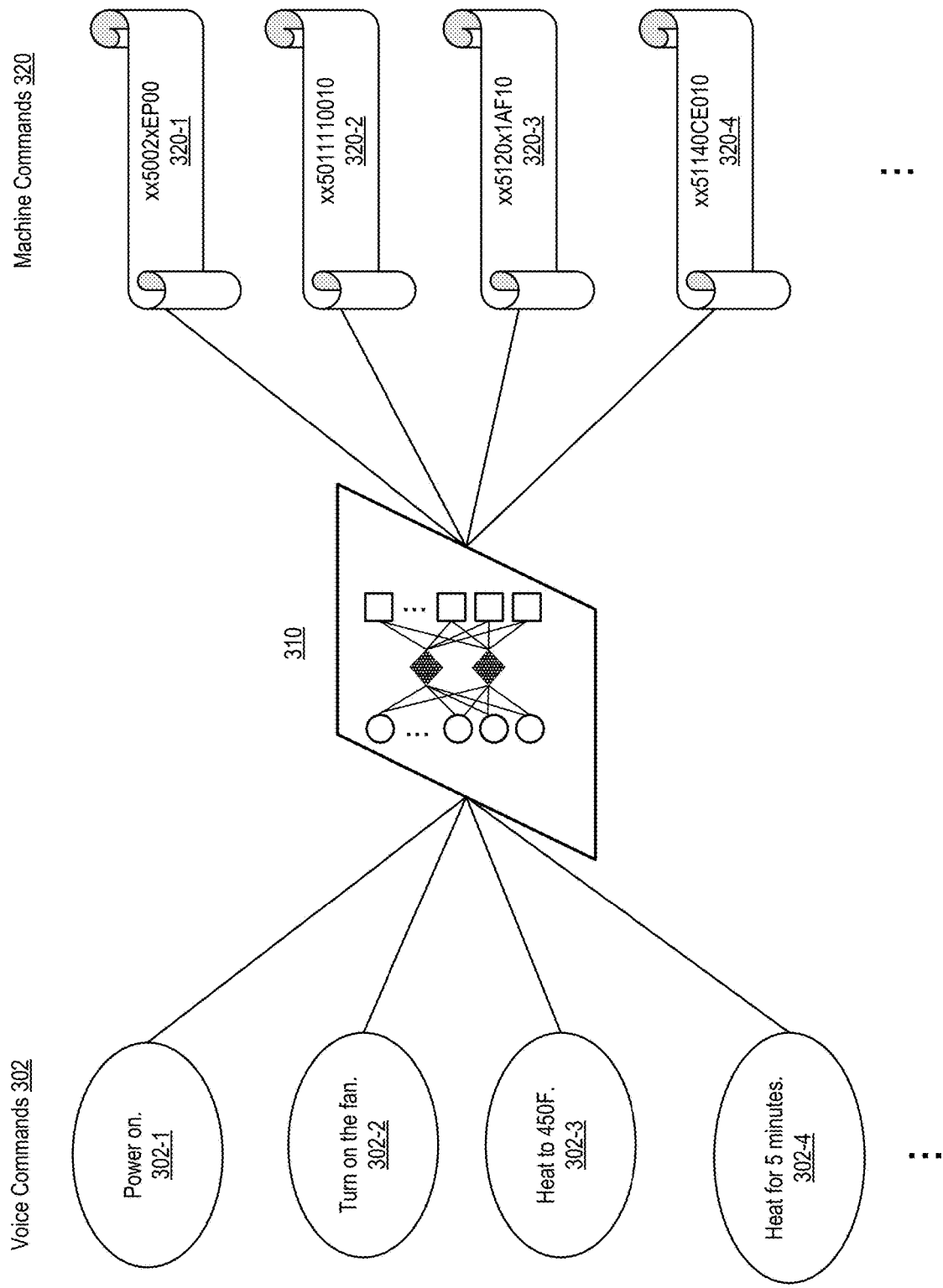
FIG. 3 is a block diagram of an example natural language processing (NLP) model for an appliance type used in the voice control apparatus in accordance with some embodiments.

FIG. 3 is a block diagram of an example natural language processing (NLP) model 310 for an appliance type (e.g., for the stove 124(d), FIG. 1) used in the voice control apparatus 102 in accordance with some embodiments. As discussed herein, a respective NLP model 310 (e.g., corresponding to the NLP model 132 in FIG. 1) in the voice control apparatus 102 is a template-based model, or a state machine, that can be used to process a limited number of types of voice commands corresponding to the same number of predetermined operations associated with the corresponding appliance. For example, as shown in FIG. 3, a limited number of voice commands, including voice command 302-1 "Power on," voice command 302-2 "Turn on the fan," voice command 302-3 "Heat to 450 F," and voice command 302-4 "Heat for 5 minutes." The data samples including the user's voice command related to using these functions of the stove 124(d), as long as voice command related to these functions from other users, may be used to train the NLP model 310. As a result, the same number of machine commands corresponding to the predetermined operations associated with the stove 124(d) can be obtained. These machine commands can be recognized by the stove 124(d) to perform corresponding operations. For example, command 320-1 "xx5002xEP00" corresponds to the voice command 302-1 "Power on," command 320-2 "xx5011110010" corresponds to the voice command 302-2 "Turn on the fan," command 320-3 "xx5120x1AF10" corresponds to the voice command 302-3 "Heat to 450 F," and command 320-4 "xx51140CE010" corresponds to the voice command 302-3 "Heat for 5 minutes." As discussed herein, for another NLP model for a different appliance, the same voice command corresponds to different machine command that is recognizable for this other appliance.

The voice command and corresponding machine command shown in FIG. 3 are merely illustrative. Other voice command and corresponding machine command for controlling respective appliances are possible, in various embodiments. More details of using the functions of the voice control apparatus 102 and the user device 202 are set forth below with respect to the flowchart shown in FIG. 4 and FIG. 7 respectively.

FIG. 4 is a flowchart diagram of a method 400 of providing a voice-based control user interface for multiple types of appliances in accordance with some embodiments. In some embodiments, the method 400 is performed at (402) a voice control apparatus (e.g., the voice control apparatus 102, FIG. 1) having one or more processors and memory. In some embodiments, the voice control apparatus 102 includes a built-in data communication interface (e.g., the data communication interface 108, FIG. 1) that is configured to establish data communication with multiple types of appliances (e.g., appliances 124(a)-(e), FIG. 1) configured to respond to distinct sets of machine commands to perform their respective appliance operations. In some embodiments, the data communication interface 108 enables connector-based communications using pins or connectors that are plugged into a corresponding interface on an appliance. In some embodiments, the data communication interface 108 enables wireless communications, including but not limited to Bluetooth, Wireless Fidelity (Wi-Fi), near-field communication (NFC), ZigBee, ultrasound, acoustics, or magnetic resonance. In some embodiments, the respective sets of machine command are formatted according to the specific machine communication and command protocols for different type of appliances, including different makes and models of appliances. In some embodiments, each appliance type (e.g., including appliance make and model) has its own set of appliance functions.

In some embodiments, the voice control apparatus 102 includes a built-in voice communication interface (e.g., the voice communication interface 104, FIG. 1) that is configured to accept voice-based inputs from a user. In some examples, the built-in voice communication interface includes a built-in microphone and voice recording device.

In some embodiments, the voice control apparatus 102 also includes a built-in natural-language processing (NLP) module (e.g., the NLP module 130) stored in the memory of the voice control apparatus 102. In some embodiments, the NLP module 130 includes a plurality of NLP models (e.g., NLP models 132(a)-132(c), FIG. 1), and a respective NLP model is configured for each of the multiple types of appliances. In some examples, a first NLP model is used for processing voice command for a stove (e.g., the stove 124(d)), a second NLP model is used for processing voice command for a refrigerator (e.g., the refrigerator 124(c)), a third NLP model is used for processing voice command for a washer, a fourth NLP model is used for processing voice command for a dryer. In some embodiments, the NLP module 130 has a respective NLP model 132 for each appliance type that the voice control apparatus 102 is configured to control. For example, the user has selected appliances and functions, and downloaded the particular NLP models to the voice control apparatus 102 through a configuration process. In some embodiments, the NLP model for each appliance type directly classifies a voice input to a respective machine command of the appliance type. Since the number of commands relevant to a particular appliance is limited, the NLP model has a small footprint and high recognition accuracy. Even if multiple NLP models are included in the voice control apparatus, the voice control apparatus can still perform all NLP processing locally without excessive memory usage or support from a server.

In some embodiments, the NLP module 130 uses a combined NLP model for each category of appliances. For example, stoves of different makes and models count as one category of appliances, and refrigerators of different makes and models count as a different category of appliances. The combined NLP model for each category of appliances is trained to recognize voice commands for a common set of functions corresponding to the category of appliances. The combined NLP model is also configured to convert the recognized voice commands to respective machine commands (e.g., formatted according to particular machine communication and command protocols) for a selected one of multiple different makes and/or models of appliances under that appliance category. Since the same category of appliances have much overlap in appliance functions, combining the command recognition portion of the NLP models for different makes and models of the appliances under the same appliance category help to reduce overall processing and memory requirements for the voice control apparatus, without negatively impacting the recognition accuracy of the combined NLP model In some embodiments, the portable voice control apparatus 102 does not include a graphical user interface, a user-interactive display, a touch-sensitive pad, or a display. In some embodiments, the voice control apparatus 102 may include a small LED or LCD screen that simply shows status information of the voice control apparatus, such as time/date, power on/off, voice communication interface active/inactive, currently in connection with which appliance.

The method 400 includes detecting (404) a user request to activate the built-in voice communication interface (e.g., the voice communication interface 104, FIG. 1) of the voice control apparatus 102. The method 400 further includes in response to detecting the user request to activate the built-in voice communication interface of the voice control apparatus (406): activating (408) the built-in voice communication interface 104 of the voice control apparatus 102, such as activating the built-in microphone and voice recording device to listen for user's voice input. The method 400 also includes in accordance with one or more target selection criteria, selecting (410) a first target appliance (e.g., an oven, a refrigerator, a washer, an air conditioner, etc.) for one or more voice-based commands that are to be received through the built-in voice communication interface 104 of the voice control apparatus 102. FIGS. 5A-5C, 5D-1, 5D-2, 5E-1, and 5E-2 are block diagrams illustrating various embodiments of activating the voice communication interface 104 of the voice control apparatus 102 in accordance with some embodiments.

Figure 5B:
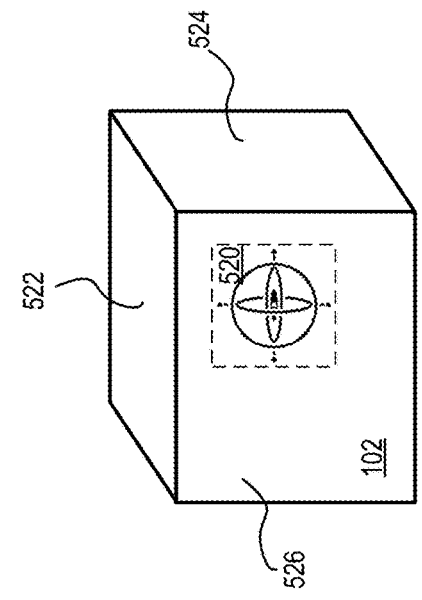
Figure 5C:
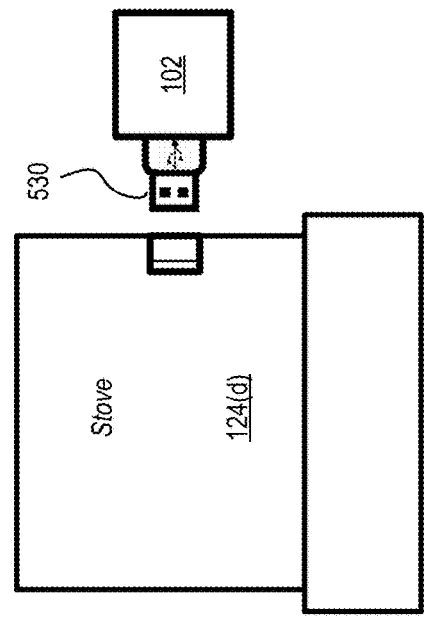
Figure 5A:
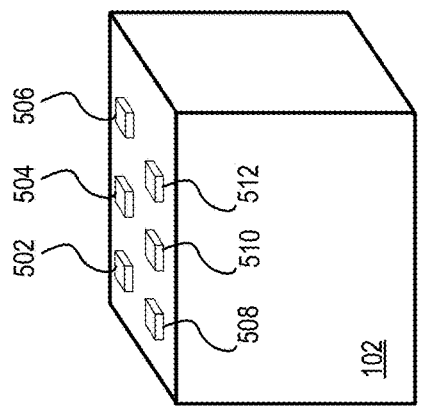

In some embodiments, the one or more target selection criteria are based on the data communication received through the activated data communication interface. For example, an appliance sends an appliance type identifier once the apparatus has established a data connection with the appliance through the data communication interface 108. In some embodiments, the target selection criteria are based on an orientation of the voice control apparatus 102. For example, a respective facet of the voice control apparatus 102 (e.g., which side of the apparatus is turned facing up, FIG. 5B) is preassigned to be associated with a certain appliance type. In some embodiments, the target selection criteria are based on which appliance selection button is pushed by the user. For example, as shown in FIG. 5A, each button is preassigned to be associated with a certain appliance type, and the target appliance can be determined by checking which button was pressed.

In some embodiments, detecting the user request to activate the built-in voice communication interface 104 comprises detecting a user interaction with a predefined portion of the voice control apparatus. For example, the voice control apparatus 102 includes a plurality of hardware activation buttons (e.g., of the physical buttons 502, 504, 506, 508, 510, and 512, FIG. 5A) disposed on an outer surface of the voice control apparatus 102. In some embodiments, the user request can come in the form of a button press on a hardware activation button of the voice control apparatus 102.

In some embodiments, the target selection module 106 of the voice control apparatus 102 selects the first target appliance for one or more voice-based commands that are to be received through the built-in voice communication interface of the voice control apparatus in accordance with determining that the predefined portion of the voice control apparatus is preassigned to be associated with the first target appliance. For example, by pressing a respective physical button (FIG. 5A), an appliance of a corresponding type of the multiple types of appliances is then selected for one or more voice-based commands to be received through the active built-in voice communication interface 104.

In some embodiments, detecting the user request to activate the built-in voice communication interface 104 comprises detecting a predefined orientational state of the voice control apparatus. In some embodiments, the target selection module 106 selects the first target appliance for one or more voice-based commands that are to be received through the built-in voice communication interface of the voice control apparatus in accordance with determining that the predefined orientational state of the voice control apparatus is preassigned to be associated with the first target appliance. For example, when a first facet is pointing up, an appliance of the associated appliance type of the first facet, e.g., a fridge, is selected to be the target appliance. Alternatively, when a second facet is pointing up, an appliance of the associated appliance type of the second facet, e.g., a microwave oven, is selected to be the target appliance. In some embodiments, the voice control apparatus 102 includes a gyroscope (e.g., the gyroscope 520, FIG. 5B) and has multiple facets (e.g., facets 522, 524, and 526, FIG. 5B) disposed on an outer surface of the voice control apparatus 102. In some embodiments, a respective facet is preassigned to be associated with an appliance type of the multiple types of appliances. For example, the facet 522 is preassigned to be associated with fridge, the facet 524 is preassigned to be associated with stove oven, and the facet 526 is preassigned to be associated with microwave oven. In some embodiments, the user request includes changing an orientation of the voice control apparatus 102, such as turning the apparatus upside down, or to a particular orientation corresponding to a desired appliance type.

Figures 2, 5D:
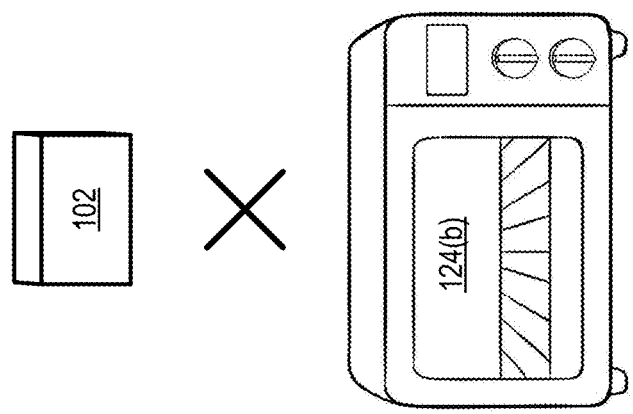
Figures 1, 5D:
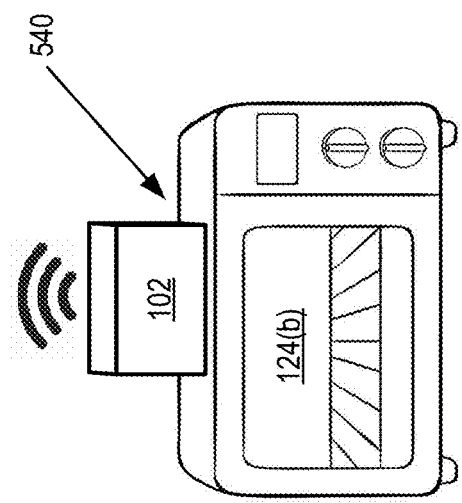

In some embodiments, the built-in voice communication interface 104 is activated in response to activating the data communication interface 108. For example, as shown in FIG. 5C, the voice control apparatus 102 is plugged into a communication interface (e.g., USB connection 530, FIG. 5C) of an appliance (e.g., the stove oven 124(d), FIG. 5C) to enable data communication between the voice control apparatus 102 and the stove 124(d). In another example, as shown in FIG. 5D-1, the voice control apparatus 102 is placed very close (e.g., in proximity) to or in direct contact (e.g., is placed directly on) with the microwave oven 124(b) to activate near-field communication (NFC) 540 between the voice control apparatus 102 and the microwave oven 124(b). In response to activating the data communication, the voice communication interface 104 is activated to receive user's voice command for controlling appliance(s). On the other hand, as shown in FIG. 5D-2, when the voice control apparatus 102 is located too far from the microwave oven 124(b), there is no NFC established between the voice control apparatus 102 and the microwave oven 124(b).

Figures 2, 5E:
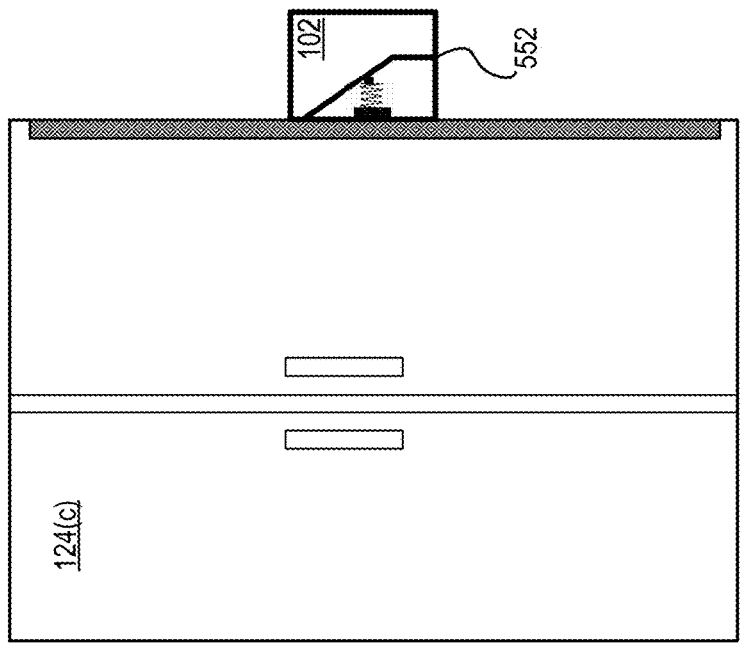
Figures 1, 5E:
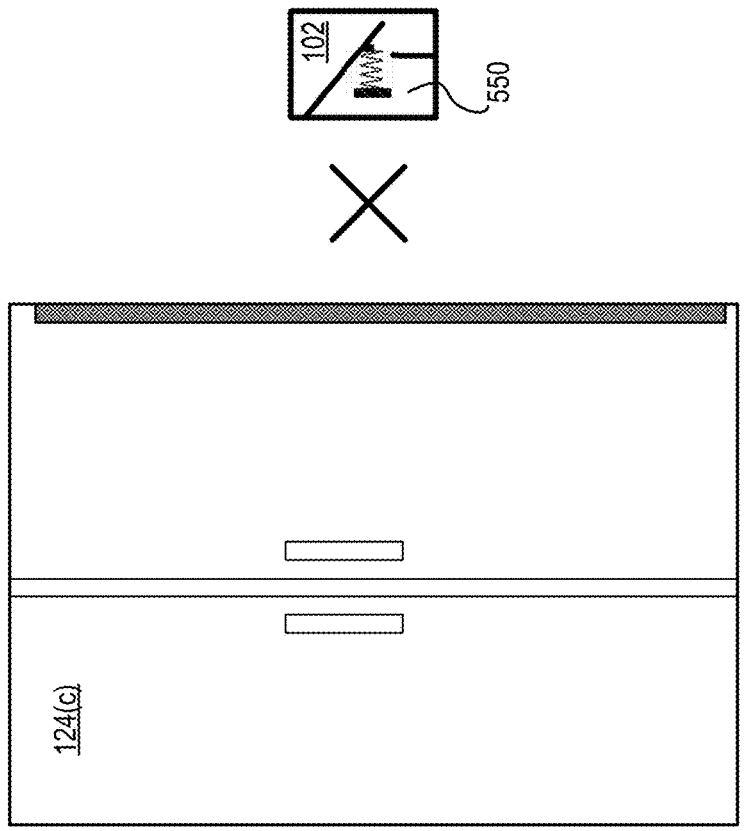

In some embodiments, as shown in FIGS. 5E-1 and 5E-2, the built-in voice communication interface 104 is activated when the voice control apparatus 102 includes a magnet 550 that can be attached to the surface of the appliance (e.g., the fridge 124(c)). The attachment of the magnet 550 to the fridge 124(c) may cause the switch 552 to be closed, which further triggers the activation of the voice communication interface 104.

As disclosed herein, in some embodiments, detecting the user request to activate the built-in voice communication interface comprises detecting that the voice control apparatus is physically coupled (e.g., by magnetically attaching (e.g., FIGS. 5E-1 and 5E-2), connector-connected (e.g., USB, FIG. 5C), to an appliance of a respective type of the multiple types of appliances. In some embodiments, the one or more target selection criteria require that the appliance is selected as the first target appliance in accordance with a determination that the voice control apparatus 102 is physically coupled to the appliance (e.g., stove 124(d) in FIG. 5C, microwave oven 124(b) in FIGS. 5D-1 and 5D-2, and fridge 124(c) in FIGS. 5E-1 and 5E-2). In some embodiments, the voice control apparatus 102 activates the built-in data communication interface 108 to transmit machine commands to the first target appliance via the physical connection between the voice control apparatus 102 and the target appliance.

In some embodiments, detecting the user request to activate the built-in voice communication interface comprises detecting that the voice control apparatus has been brought within a threshold distance of an appliance of a respective one of the multiple types of appliances. In some embodiments, the voice control apparatus is equipped with a motion sensor, and when it is picked up by a user and moves with the user as the user walks around the room, the voice control apparatus is activated to listen for communication requests from an appliance. Appliances that are plugged into a continuous power source can periodically sends out communication requests to the voice control apparatus, and the communication request of a particular appliance will be picked up by the voice control apparatus when the voice control apparatus is brought within a threshold distance of the particular appliance. In some embodiments, a particular appliance will send out a communication request to the voice control apparatus when a predefined button on the appliance is activated by the user (when the user is standing next to the particular appliance with the voice control apparatus in his pocket, and presses a voice control activation button on the appliance). In some embodiments, the voice control apparatus is equipped with a sensor, such as an object/obstacle detection sensor (e.g., an infrared sensor, a radar, or an ultrasonic sensor), to detect the appliance as the user having the voice control apparatus walks within the threshold distance from the appliance.

In some embodiments, the target selection module 106 selects the first target appliance for one or more voice-based commands that are to be received through the built-in voice communication interface of the voice control apparatus in accordance with detecting that the voice control apparatus is within the threshold distance of the first target appliance (e.g., FIGS. 5D-1 and 5D-2). In some embodiments, the voice control apparatus is further configured to identify the appliance type based on the size, shape, location of the detected object based on the communication request.

In some embodiments, the method 400 further includes activating, in response to detecting the user request to activate the built-in voice communication interface of the voice control apparatus, the built-in data communication interface configured to transmit machine commands to one or more appliances of the multiple types of appliances. In some embodiments, in order to save energy consumption, the built-in data communication interface of the voice control apparatus is not constantly on. In some embodiments, the built-in data communication interface is activated when the built-in voice communication interface is activated. In some embodiments, the built-in data communication interface is deactivated (e.g., goes to sleep, automatically goes inactive) when the built-in voice communication interface is deactivated. In some embodiments, when the voice control apparatus wirelessly communicates with one or more devices (e.g., appliances), the built-in data communication interface is activated to be able to communicate to any other communicable devices/appliances. In some embodiments, the built-in data communication interface comprises a plurality of communication channels (or bands) to communicate with multiple devices and/or appliances respectively. For example, a respective communication channel may have a different frequency range from another communication channel to reduce interference among communications with different devices. In some embodiments, the built-in data communication interface is activated when the voice control apparatus is physically coupled to an appliance (e.g., as discussed with reference to FIGS. 5C, 5D-1, 5D-2, 5E-1, and 5E-2), or when a respective physical characteristic preassigned to be associated with an appliance is triggered (e.g., as discussed with reference to FIGS. 5A-5B).

In some embodiments, the method 400 also includes selecting the first target appliance for one or more voice-based commands that are to be received through the built-in voice communication interface of the voice control apparatus in accordance with receiving a message including an appliance type identifier identifying the appliance type of the first target appliance via the activated built-in data communication interface. In some embodiments, after the built-in data communication interface is activated, the voice control apparatus receives a message via the built-in data communication interface to identify the appliance type of the appliance to be selected as the target appliance. In some embodiments, when the voice control apparatus is physical coupled to the appliance, the voice control apparatus receives the message via the physical coupling method, e.g., USB, between the voice control apparatus and the appliance to be selected as the target appliance. In some embodiments, the voice control apparatus receives the message from the appliance to be selected as the target appliance. In some embodiments, when the activated built-in data communication is capable of communicating to a user device (e.g., a mobile phone, a tablet, a PC, etc.), the voice control apparatus receives the message from the user device that identifies the target appliance. For example, the message is sent by the user from the user device by selecting the appliance type of the target appliance from a listing of appliances displayed on the user device while using an application associated with the voice control apparatus or an appliance associated with the target appliance. In some embodiments, the built-in voice communication interface of the voice control apparatus is constantly on or periodically on, and the voice control apparatus selects the target appliance in accordance with receiving a message identifying the appliance type of the appliance to be selected as the target appliance. That is, the selection of the target appliance may not be associated with the activation of the built-in data communication interface as disclosed herein.

In some embodiments, the method of detecting the user request to activate voice interface is associated with the method of selecting the target appliance. In some embodiments, these two aspects may not necessarily be associated with each other. For example, a user attaches the voice control apparatus on a fridge only to active the voice communication interface. Then by pressing a predefined button preassigned to be associated with a fridge on the voice control apparatus, the fridge is selected as the target appliance. In another example, the data communication interface is activated by the physical attachment (e.g., via USB), then the voice control apparatus receives a message including a fridge identifier from the fridge, then the voice control apparatus selects the fridge as the target appliance. In yet another example, the voice control apparatus includes an NLP trained model which can understand simple voice command. After the voice communication interface is activated, the user can say "fridge." The voice control apparatus can understand such simple command, and the target selection module will proceed to select fridge as the target appliance for the following steps.

In some embodiments, before detecting the user request to activate the built-in voice communication interface, the built-in voice communication interface 104 of the voice control apparatus 102 is inactive. In some embodiments, for low energy consumption purpose and user privacy protection, the voice control apparatus is not constantly listening. The built-in voice communication interface and related hardware (e.g., microphone) are inactive until a triggering event, e.g., a user request to activate the voice communication interface, is received. That is, if a user randomly gives a voice input, the voice control apparatus will not be responsive to the voice input. In some embodiments, the built-in voice communication interface may be awake periodically on a predetermined schedule, e.g., during lunch preparation time at 11 am, and go inactive at 12:30 pm, and awake for dinner time 5 pm to 7 pm on weekdays.

In some embodiments, after activating the built-in voice communication interface, the method 400 includes keeping the built-in voice communication interface 104 active for a predetermined period of time. For example, the built-in voice communication interface 104 goes inactive if no voice input is received for a predefined time period, such as 1, 2, 3, 5, or 10 minutes. In some examples, the built-in voice communication interface 104 goes inactive until receiving a user request to deactivate the built-in voice communication interface (e.g., by pressing a button to turn the mic off, changing a facet, unhooking/detaching the voice control apparatus from the target appliance, changing the location of the voice control apparatus to be out of the range from the target appliance.

In some embodiments, the built-in data communication interface 108 corresponds to a wireless communication protocol selected from the group consisting of: Bluetooth, Wireless Fidelity (Wi-Fi), near-field communication (NFC), ZigBee, ultrasound, acoustics, and magnetic resonance.

In some embodiments, prior to receiving the first voice input, the method 400 further includes obtaining and installing a plurality of NLP models in the built-in NLP module 130 in accordance with user selections of a plurality sets of appliance functions for a plurality of appliance types respectively. Each NLP model corresponds to a respective set of appliance functions for a respective appliance type. In some embodiments, a respective NLP model is trained based on voice command data issued by one or more users to control a respective appliance of the respective appliance type to perform the corresponding set of appliance functions.

In some embodiments, the method 400 further comprises after selecting the first target appliance in accordance with the one or more target selection criteria, establishing a first wireless data communication with the first target appliance. For example, after selecting the first target appliance, the voice control apparatus pairs with the first target appliance via Bluetooth or NFC.

In some embodiments, the method 400 further comprises detecting a second user request to switch from the first target appliance to a second target appliance to be controlled by the user using one or more voice-based commands though the built-in voice communication interface of the voice control apparatus. In some examples, the user detaches the voice control apparatus from the first appliance, e.g., fridge, and then attaches it to a second appliance, e.g., a microwave oven. In some embodiments, the user may push another physical button or change to a different orientational state to which is respectively associated with a different applicant type from the appliance type of the first target appliance. In some embodiments, in response to detecting the second user request, the method 400 includes selecting the second target appliance for one or more voice-based commands that are to be received through the built-in voice communication interface; deactivating the first data communication with the first target appliance; and establishing a second data communication to transmit machine commands to the second target appliance. Thus in the present disclosure, a connection to one target appliance is established at a time, to save energy consumption and to avoid complex data communication hardware/software configurations.

While the built-in voice communication interface remains activated and a current selection of the first target appliance remains unchanged (e.g., while the voice control apparatus has not been moved to a different appliance or experienced other changes that meet the target selection criteria for a different target appliance, and while a timeout period has not expired since activation of the microphone), method 400 includes receiving (412) a first voice input through the built-in voice communication interface of the voice control apparatus (e.g., "Turn on power." "Turn off oven." "Set power to high." "Turn on the fan." "Activate morning operation profile." "Activate power-save mode.", etc.). In response to receiving (414) the first voice input, method 400 includes: in accordance with a determination that the first target appliance is a first appliance of a first appliance type (e.g., the first target appliance is the stove), processing (416) the first voice input (e.g., "Turn on the fan.") using a first NLP model of the built-in NLP module that corresponds to the first appliance type (e.g., a language model that is trained with only voice commands corresponding to the functions of the stove) to obtain a first machine command (e.g., machine command xx5002xEP00), and sending (416), via the built-in data communication interface, the first machine command to the first appliance (e.g., the stove). In accordance with a determination that the first target appliance is a second appliance of a second appliance type (e.g., the target appliance is the air conditioner) that is distinct from the first appliance type, method 400 includes processing (418) the first voice input (e.g., "Turn on the fan.") using a second NLP model of the built-in NLP module that corresponds to the second appliance type (e.g., a language model that is trained with only voice commands corresponding to the functions of the air conditioner) to obtain a second machine command (e.g., machine command xx5011110010), and sending (418), via the built-in data communication interface, the second machine command to the second appliance.

Figure 6A:
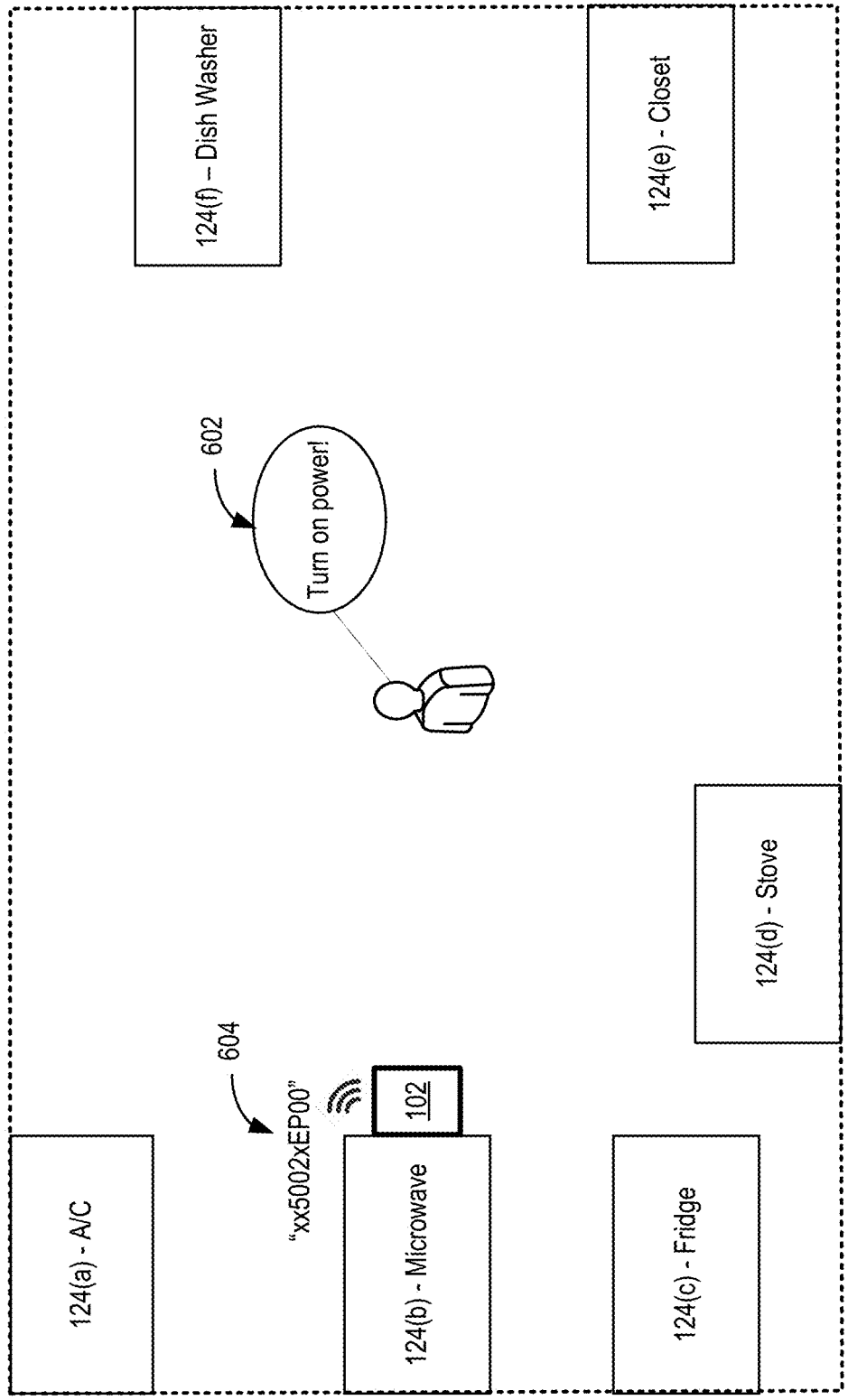

FIGS. 6A-6B are block diagrams illustrating various operating scenarios of using the voice control apparatus 102 for controlling multiple types of appliances in accordance with some embodiments. In some embodiments, when the voice control apparatus is attached or placed in proximity to the first target appliance microwave oven 124(*b*), the user speaks a voice command 602 "Power on." The voice control apparatus processes the voice command 602 using a NLP model corresponding to the microwave oven 124(*b*) to obtain machine command 604 xx5002xEP00 to turn on the power of the microwave oven 124(*b*). After the target appliance is switched from the first appliance microwave oven 124(*b*) to a second target appliance stove 124(*d*), the voice control apparatus then processes the voice command 612 "Power on." using a different NLP model corresponding to the microwave oven 124(*b*) to obtain machine command 614 xx5170xAB14 to turn on the power of the microwave oven 124(*b*).

In some embodiments, the NLP model selection module 134 of the voice control apparatus selects a respective NLP model from the multiple NLP models stored in the built-in NLP module 130 based on the NLP model registry 136 stored in the memory. For example, the NLP model registry 136 stores identifiers of the multiple NLP models respectively in association with identifiers of multiple appliance types. The NLP model registry 136 may be created/customized during an initial setup process (e.g., customized by the user), and can be updated whenever the user wants to delete or add one or more NLP models to control one or more sets of functions of appliances. After identifying a first identifier of the first appliance type (e.g., while selecting the target appliance), the apparatus retrieves an identifier of a corresponding NLP model from the NLP model registry 136, and then retrieves the corresponding NLP model from the NLP module 130 to process the voice input.

In some embodiments, selecting the first target appliance further comprises determining whether the built-in NLP module stores an NLP model corresponding to the appliance type of the first target appliance. For example, the NLP module stores a registration table listing model IDs of multiple NLP models in association with appliance type IDs respectively. For example, after receiving the appliance type identification of the first target appliance, the NLP module checks its registration table to see if it stores the NLP model for this particular appliance type. In accordance with a determination that the built-in NLP module stores a NLP model corresponding to the appliance type of the first target appliance, the NLP model selection module 134 selects the NLP model corresponding to the appliance type of the first target appliance. In accordance with a determination that the built-in NLP module does not store the NLP model corresponding to the appliance type of the first target appliance, the voice control apparatus returns an error message to the first target appliance. For example, the appliance then notifies the user of the absence of the NLP model, and suggests the user to retrieve the NLP model from NLP model server using the user's mobile phone. In some embodiments, the appliance (or a user device coupled to the voice control apparatus) may also notify the user when there is an update to the NLP model(s) that have been stored at the voice control apparatus, e.g., listed in the registry.

In some embodiments, the voice control apparatus further comprises the battery 110, and wherein the method 400 further comprises: charging the battery 110 of the voice control apparatus by the first target appliance via the built-in data communication interface in response to establishing data communication with the first target appliance. For example, the voice control apparatus is charged via USB or cable connected to the appliance. In another example, the battery can be wirelessly charged, via the built-in data communication interface, thus no additional power cord is needed. For example, the charging could take place in response to activating the data communication interface with the target appliance, or in response to selecting the target appliance. For example, in some embodiments, the voice control apparatus may not include a battery where such voice control apparatus has power only when coupled to an appliance to receive power either via electric cap or wirelessly (e.g., radio frequency wireless charging), then requires the voice control apparatus to have a small wireless charging module, including a receiving coil to receive and transmit magnetic field of RF signals into AC current, then a rectifier to convert the AC current into DC current to charge the battery.

In some embodiments, in response to starting to charge the battery of the voice control apparatus (e.g., via wired or wireless coupling with the appliance), the method 400 further includes searching for a user device by broadcasting data communication request messages, wherein the user device is configured to communicate with an NLP model server that trains a plurality of NLP models including the first NLP model and the second NLP model. In some embodiments, the voice control apparatus broadcasts signal which can be picked up by the user device that is pre-paired/pre-associated with the voice control apparatus (e.g., an identifier of the user device has been stored in a registration table in the voice control apparatus) during initial customization process. If the apparatus cannot find the mobile phone within a threshold amount of time, the apparatus rests and just gets charged.

In some embodiments, the method 400 further includes collecting voice data from one or more voice inputs of the user associated with managing one or more appliances (e.g., collecting voice samples for training and updating one or more NLP models for one or more types of appliances) respectively. In accordance with a determination that the voice control apparatus has established a data communication connection with a user device that is capable of communicating with an NLP model server configured to train a plurality of NLP models including the first NLP model and the second NLP model, the method 400 includes sending the collected voice data to the user device for forwarding to the NLP model server to update one or more NLP models corresponding to the one or more appliances of one or more appliance types respectively. In some embodiments, when the voice control apparatus is coupled to the mobile phone (e.g., during the initial setup/customization process or during charging, the apparatus searches and finds the mobile phone), the voice control apparatus uploads most recent voice input data to the mobile phone, and the mobile phone forwards the voice input data to the NLP server for training and updating the corresponding NLP models. In some embodiments, the method 400 includes deleting the collected voice data from the voice control apparatus after a predetermined time period from uploading the collected voice data to the user device e.g., to free memory space on the voice control apparatus. In some embodiments, the method 400 includes deleting the collected voice data from the voice control apparatus after a predetermined time period from collecting the voice data, e.g., to free memory space on the voice control apparatus.

It should be understood that the particular order in which the operations in FIG. 4 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 400 described above.

FIG. 7 is a flowchart diagram of a method 700 of customizing a portable voice-based control user interface for multiple types of appliances in accordance with some embodiments. FIGS. 8A-8G illustrate examples of systems and user interfaces for customizing a portable voice-based control user interface for multiple types of appliances in accordance with some embodiments. In some embodiments, the method 700 is performed at the user device 202 (e.g., a smart phone or tablet device, or a desktop computer) having one or more processors, memory, and a display. In some embodiments, the method 700 includes establishing (702) a data communication connection with the voice control apparatus 102. In some embodiments as discussed herein, the voice control apparatus 102 has a built-in data communication interface (e.g., the data communication interface 108, FIG. 1) that is configured to establish data communication with multiple types of appliances (e.g., stoves, refrigerators, microwaves, washers, dryers, air conditioners, etc.) configured to respond to distinct sets of machine commands (e.g., respective sets of machine commands that are formatted according to the specific machine communication and command protocols for different type of appliances, including different makes and models of appliances) to perform their respective appliance operations (e.g., each appliance type (e.g., including appliance make and model) has its own set of appliance functions), a built-in voice communication interface (e.g., the voice communication interface 104, FIG. 1) that is configured to accept voice-based inputs from a user, and a built-in natural-language processing (NLP) module (e.g., the NLP module 130, FIG. 1) stored in the memory of the voice control apparatus, wherein the NLP module is configured to store multiple NLP models and selectively utilize a respective one of the multiple NLP models in accordance with a specified target appliance for a currently received voice input.

In some embodiments, the establishment of the data communication connection is driven by the user. For example, the user unboxes the apparatus and manually connects the apparatus to the user device, or pushes a button on the apparatus, turn to a facet associated with the user device, to wirelessly connect (e.g., Bluetooth pairing) to the user device. In another example, the user first opens the application associated with the apparatus management on the user device, browses the function list, and clicks to "connect" to the apparatus. In this case, unless the voice control apparatus is physically connected to the user device or manually triggered to "listen", it requires the voice control apparatus to be able to listen. In some embodiments, the establishment of the data communication connection is driven by the device (e.g., the voice control apparatus starts charging and searching for the user device).

Figure 8A:
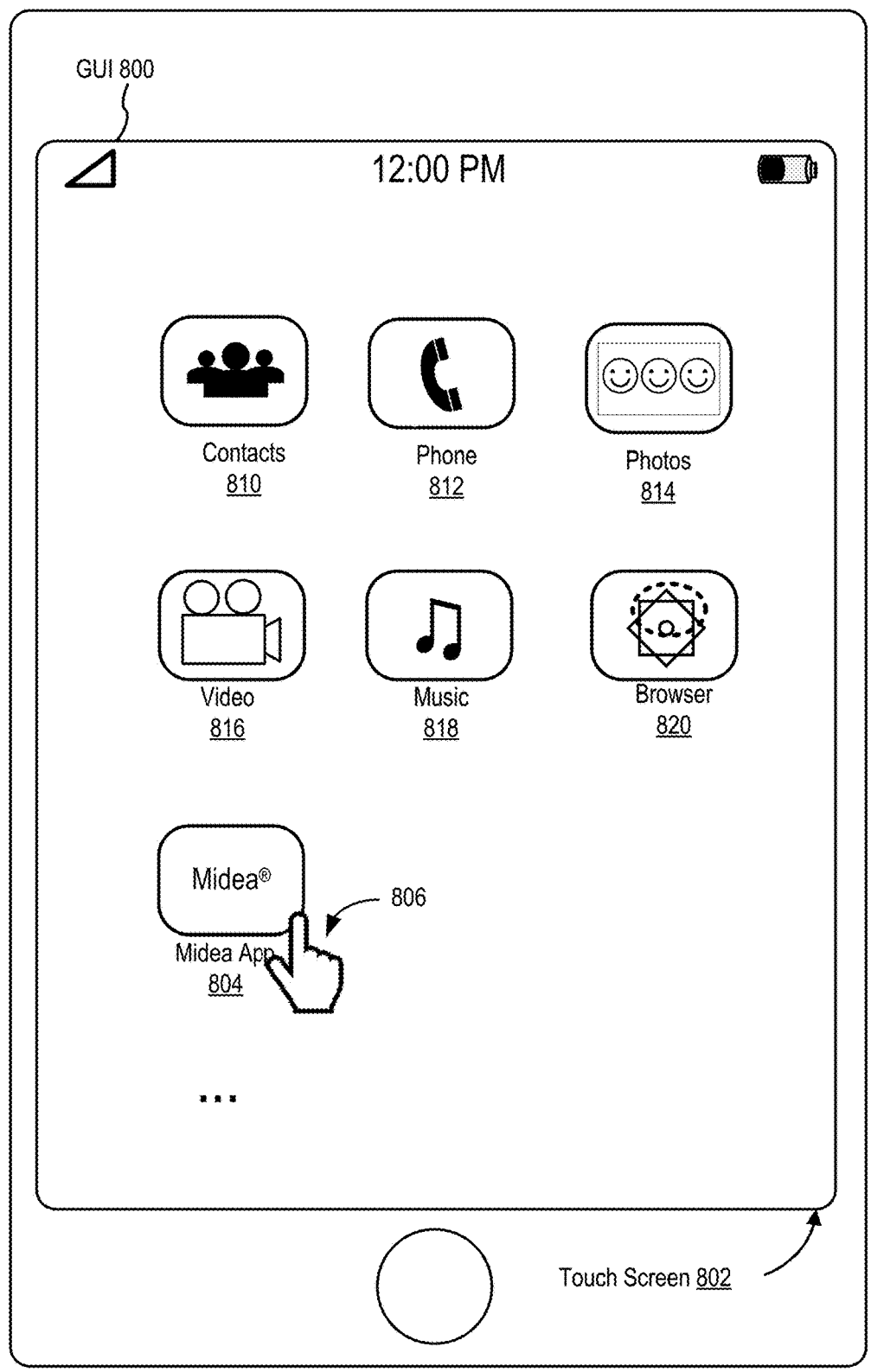

In some embodiments, the method 700 includes detecting (704) a first user request to update the NLP module of the voice control apparatus. In some examples, the request is in the form of opening a user application corresponding to the voice control apparatus and selecting the update function from a graphical user interface of the user application; or responding to a prompt/notification displayed in the user device. For example, as shown in FIG. 8A, a plurality of application icons are displayed on the user interface 800 of the user device 202. The user device 202 detects the user gesture 806 to open the application 804 ("Midea App") displayed on the GUI 800 corresponding to the voice control apparatus. In some embodiments, in response to detecting (706) the first user request to update the NLP module of the voice control apparatus: the method 700 further includes establishing (708) a connection to a NLP model server (e.g., server 220 in FIG. 2) corresponding to the voice control apparatus. For example, as shown in FIG. 2, the user device connects to the NLP model server 220 via network(s) 240.

Figure 8B:
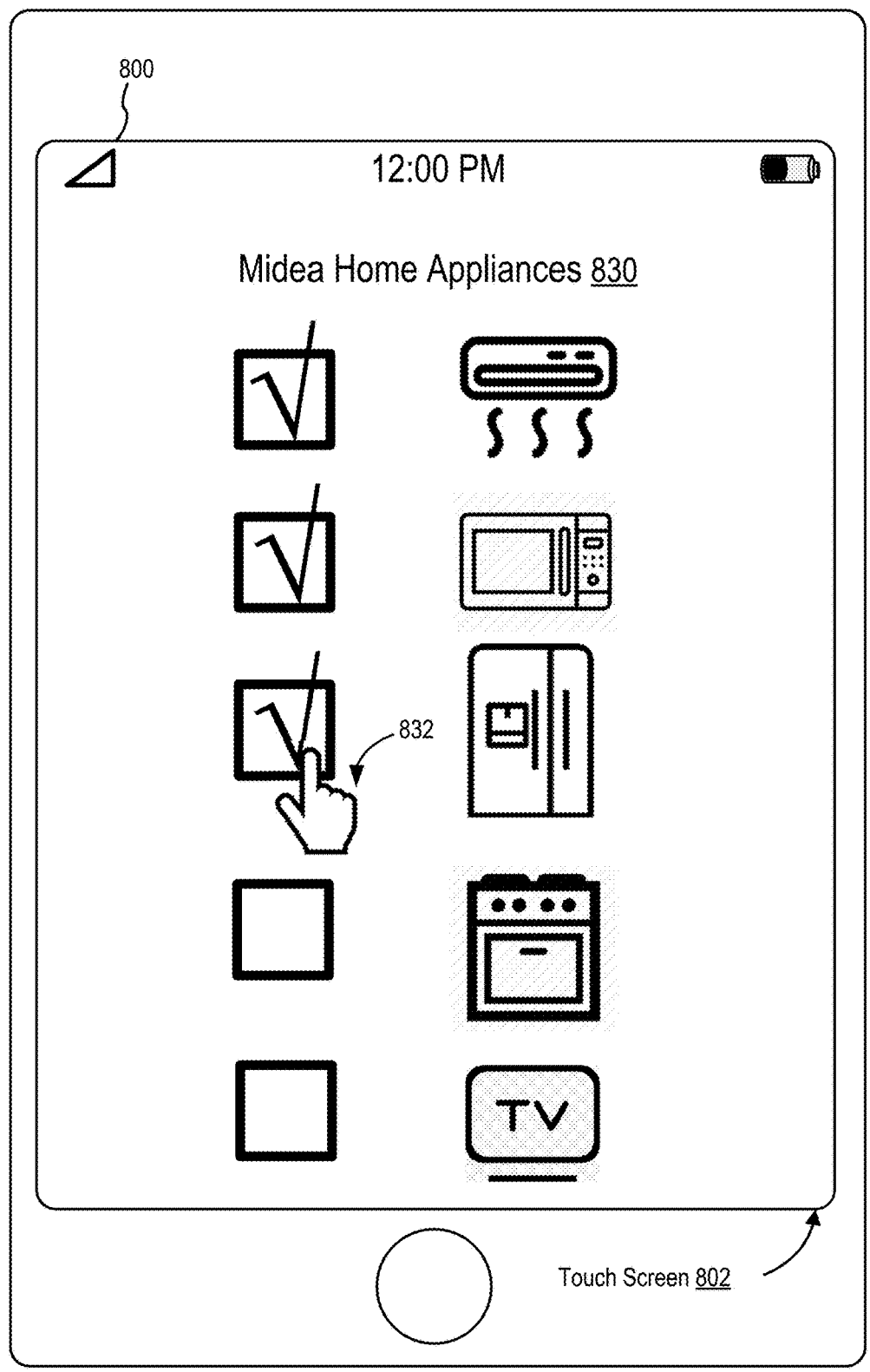
Figure 8C:
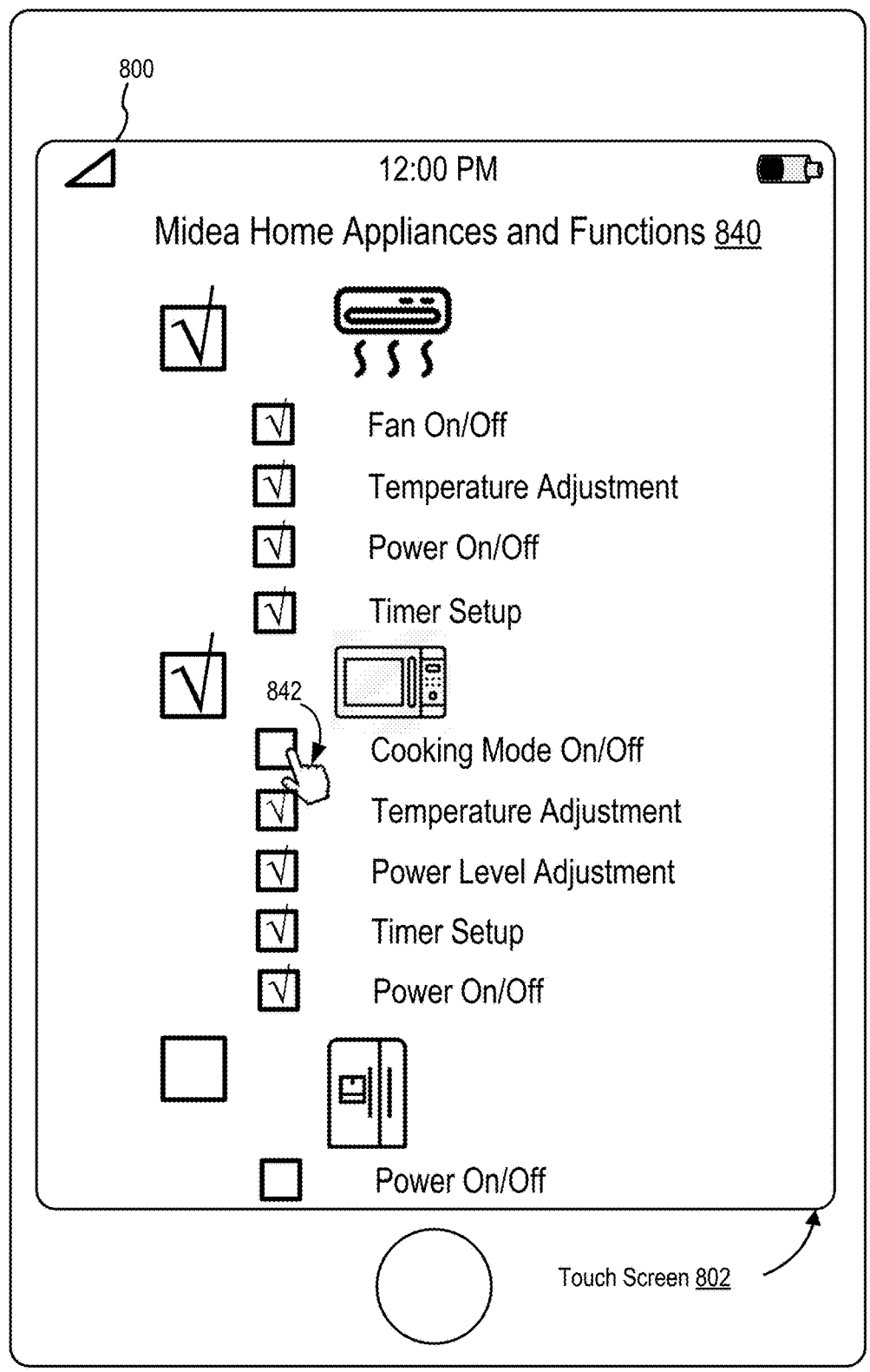

In some embodiments, the method 700 further includes displaying (710), on the display, a listing of appliance types (Midea Home Appliances 830, FIG. 8B) and a respective listing of appliance functions for each appliance type (Midea Home Appliances and Functions 840, FIG. 8C), in a graphical user interface (e.g., graphical user interface 800 in FIGS. 8B-8C). For example, as shown in FIG. 8B, the user selects (832) air conditioning, microwave oven, and fridge in the home appliances listing, indicating that the user wants to have corresponding NLP models installed on the voice control apparatus 102 such that the user can use voice command to control these appliances via the voice control apparatus 102.

In some embodiments, the method 700 further includes receiving (712) user selection of a first set of appliance functions for a first appliance type and a second set of appliance functions for a second appliance type, displayed in the graphical user interface. For example, as shown in FIG. 8C, the user selects all function associated with the air conditioning, such that a complete NLP model for controlling the air conditioning using all voice commands will be integrated into the voice control apparatus 102. On the other hand, the user selects some functions, not all, for the microwave oven. For example, the user may not like using pre-programmed cooking mode functions. Instead, the user commonly adjusts temperature, power level, timer, when using the microwave oven, in addition to turning the power on and off. Thus, a customized NLP model will be integrated into the voice control apparatus 102 to accommodate the user's needs to exclude the "cooking mode on/off" functions and use voice command to control only the selected functions of the microwave oven.

In some embodiments, the method 700 further includes in response to receiving (714) the user selection of the first set of appliance functions for the first appliance type and the second set of appliance functions for the second appliance type: downloading (716), from the NLP model server (e.g., the server system 220, FIG. 2), a first NLP model that is trained on voice commands for the first set of appliance functions for the first appliance type, and a second NLP model that is trained on voice commands for the second set of appliance functions for the second appliance type.

In some embodiments, the NLP models that are trained on voice commands for appliance functions of other appliance types are not downloaded from the server, if they are not selected by the user). In some embodiments, the user input includes a user request to delete a NLP model that has already been downloaded (e.g., the NLP models already stored on the voice control apparatus are also displayed (e.g., appearing in a checked or selected form) in the listings of appliance types and appliance functions in the graphical user interface), and in response to the request (e.g., the user unselecting the appliance type for a particular NLP model that is already downloaded), the user device sends a deletion signal to the voice control apparatus to delete the NLP models that the user has selected for deletion.)

In some embodiments, the method 700 further includes integrating (718) the downloaded first NLP model and second NLP model into the NLP module (e.g., the NLP module 130, FIG. 1) of the voice control apparatus. In some embodiments, the method 700 further includes establishing registry identifiers for the first and second NLP models and storing the registry identifiers to a master table of NLP models of the NLP module 130. In some embodiments, the method 700 further includes establishing input and output interfaces between the NLP module 130 and the first and second NLP models 132, such that the NLP module 130 can selectively utilize the first and second NLP models 132 among the existing NLP models stored on the voice control apparatus, in accordance with a specified target appliance for a currently received voice input.

In some embodiments, establishing the data communication connection with the voice control apparatus comprises: receiving a data communication request from the voice control apparatus when the voice control apparatus is charging a battery of the voice control apparatus. For example, as shown in FIG. 8E, when the voice control apparatus 102 is plugged in for charging, the voice control apparatus 102 starts searching for the user device 202. In some embodiments, when the voice control apparatus 102 finds the user device 202 (e.g., based on an established relationship from a previous connection), the user device 202 displays a prompt 860 (e.g., "voice control apparatus wants to connect") to ask for user's response to the voice control apparatus' request to connect to the user device 202. In some embodiments, after the user selects 866 "accept" 864 on the user interface 800, the user device 202 establishes a data communication (e.g., wireless) with the voice control apparatus 102. Then the user interacts with the user device 202 to update NLP models and/or the voice control apparatus 102 uploads the stored training data to the user device 202.

In some embodiments, the first user request to update the NLP module 130 of the voice control apparatus is detected in response to connecting the voice control apparatus to the user device. For example, as shown in FIG. 8D, the voice control apparatus 102 is communicatively coupled to the user device 102 via wireless communication method or USB connection. After the data communication is established between the voice control apparatus 102 and the user device 102, the user device 202 displays a prompt 885060 (e.g., "voice control apparatus connected, proceed to update NLP module?") to ask for user's response to the NLP module update request. In some embodiments, after the user selects 856 "OK" 854 on the user interface 800, the user device proceeds to update the NLP module 130 in the voice control apparatus 102.

In some embodiments, detecting the first user request to update the NLP module of the voice control apparatus comprises: detecting a user input for launching a user application for managing the voice control apparatus in the user device; and detecting a user selection of an update function displayed in a graphical user interface of the user application. In some embodiments, updating NLP module of the voice control apparatus may be the first time setting up the apparatus, or later updating/adjusting the existing NLP models.

In some embodiments, the method 700 further includes after integrating the first NLP model into the NLP model module at the voice control apparatus: establishing the data communication connection with the voice control apparatus. This is performed after the initial data communication connection to setup the apparatus. For example, the user can plug in the voice control apparatus to the user device or choose to wirelessly connect to the voice control apparatus using the application, or voice control apparatus can search for the user device when charging its battery and prompts to notify the user. the method 700 further includes receiving, from the voice control apparatus, voice data of one or more voice commands from the user for controlling the first set of appliance functions for the first appliance type; uploading the voice data to the NLP model server corresponding to the voice control apparatus after establishing the connection to the NLP model server; receiving the first NLP model from the NLP model server after the NLP model server updates the first NLP model using the voice data of the one or more voice commands; and integrating the adjusted first NLP model into the NLP module of the voice control apparatus. In some embodiments, the NLP model server updates the first NLP model using the voice data of the one or more voice commands from the user to further customize the NLP model based on the vocal characteristics (e.g., dialect) of the user (e.g., owner) of this particular voice control apparatus.

In this embodiment, the NLP model is updated (e.g., customized) with new voice data from the user. The user device relays the collected voice data from the voice control apparatus to the NLP server. In some embodiments, the voice control apparatus accumulates voice data received during a period of time when it is not connected to the user device. This process may be performed when the voice control apparatus has data communication connection to the user device, either driven by the user (e.g., user manually connects the voice control apparatus to the user device, or pushes a button on the voice control apparatus, turn a facet, to connect (e.g., Bluetooth pairing) to the user device, and then opens the voice control application and selects a function on the UI to upload the voice data and update the NLP model) or driven by the device (e.g., the apparatus starts charging and searching for the user device). In some embodiments, the uploading of the accumulated voice data can be performed either automatically once the apparatus is connected to the user device, or performed in response to a user request triggered by a user input, e.g., on GUI of the application, the user selects a function to "upload the new voice data samples and update the NLP model."

In some embodiments, after the voice control apparatus uploads the accumulated voice data to the user device, the user device forwards the voice data to the NLP server 220 for training/updating the first NLP model. In some embodiments, the NLP server 220 trains/updates the NLP model based on the voice data from the voice control apparatus only, such that the NLP model can have better accuracy and customization (e.g., speech characteristics of the user(s) in the household and commonly used commands in the household) to the apparatus' owner's household. In some embodiments, the NLP server trains/updates the NLP model based on the voice data from the voice control apparatus as well as voice data collected at the NLP server of the same appliance type but from different households. This type of NLP model can have better accuracy when different users are using the same appliance within the same house, e.g., at an Airbnb condo/townhouse/house having a voice control apparatus described herein, or a house rented by a plurality of students or young workers, where it is expected to host people with different dialects and different appliance using behaviors.

In some embodiments, the method 700 further includes after integrating the first NLP model into the NLP model module at the voice control apparatus: establishing the data communication connection with the voice control apparatus; receiving, from the voice control apparatus, voice data of one or more voice commands from the user for controlling the first set of appliance functions for the first appliance type; adjusting the first NLP model (e.g., by the NLP model updating module 212, FIG. 2) based on the voice data of the one or more voice commands at the user device; and integrating the adjusted first NLP model into the NLP module of the voice control apparatus. In some embodiments, the user device includes an NLP model training module 216 and/or a NLP model updating module 212 configured to train (determine respective weights of the model function) and/or adjust respective weights of an existing model function based on new data samples.

In some embodiments, the NLP models are updated with new voice data by the user device, which is capable of training/adjusting/tuning/updating one or more NLP models locally at the user device. In some embodiments, the user device trains/updates the first NLP model based on the voice data from this household only. This type of family-customized NLP model can provide better accuracy (e.g., based on more customized and focused samples) and improved user experience (e.g., better customization, e.g., dialects or personal preferences of commands). This is performed after the first NLP model has already been installed on the apparatus.

In some embodiments, the voice control apparatus transmits the accumulated voice data stored at the apparatus to the user device every time it has data connection with the user device. However, due to the limited size of the data sample each time, the user device or the NLP server trains/updates the corresponding NLP model(s) gradually. After a certain period of time, e.g., 1 month, 2 weeks, or 1 week, the user device or the NLP server generates a new version of the updated NLP model(s). The user device then integrates the new version of the NLP model(s) into the NLP module 130 at the voice control apparatus In some embodiments, the method 700 further includes after integrating the first NLP model into the NLP model module at the voice control apparatus: establishing the data communication connection with the voice control apparatus; receiving a first user input to unselect the first set of appliance functions for the first appliance type from the listing of appliance types and the respective listing of appliance functions for each appliance type displayed in the graphical user interface, wherein the first NLP model corresponding to the first set of appliance functions for the first appliance type has been integrated into the NLP module of the voice control apparatus; and in response to the first user input, sending a deleting command to the voice control apparatus to remove the first NLP model from the NLP module of the voice control apparatus.

In some embodiments, the method 700 further includes after integrating the first NLP model into the NLP model module at the voice control apparatus: establishing the data communication connection with the voice control apparatus; receiving a second user input that unselects a first subset of appliance functions from the first set of appliance functions for the first appliance type from the listing of appliance types and the respective listing of appliance functions for each appliance type displayed in the graphical user interface, wherein the first NLP model corresponding to the first set of appliance functions for the first appliance type has been integrated into the NLP module of the voice control apparatus; sending a request to the NLP model server to adjust the first NLP model based on the removal of the first subset of appliance functions from the first set of appliance functions for the first appliance type; downloading the adjusted first NLP model that is updated to exclude the first subset of appliance functions from the first set of appliance functions for the first appliance type; and integrating the adjusted first NLP model into the NLP module of the voice control apparatus. In some embodiments, the adjusted first NLP model is trained by voice command samples corresponding to the remaining appliance functions, and the effect of the training based on voice command samples for the deleted appliance functions are removed from the adjusted NLP model.

In some embodiments, this embodiment is related to unselecting a subset of functions that are not commonly used, and updating the model correspondingly, which are performed at the NLP server. In some embodiments, this process is usually performed when the user opens the application to view and edit the listing of appliance types and the respective listing of appliance functions for each appliance type displayed in the graphical user interface. Usually the data communication between the voice control apparatus and the user device is also established in response to a user event, such as plugging in the voice control apparatus to the user device, or pushing a button on the voice control apparatus to connect to the user device. In some embodiments, the data communication may also be triggered when the voice control apparatus starts charging its battery and searching and finding the user device, and upon receiving a notification of "apparatus found" on the phone, the user can open the application to interact with the listings. Customizing the appliance function listings by the user, e.g., removing a subset of functions that are not being used by the user (e.g., refer to FIG. 3, reduced number in voice commands 302 results in less complexity in the model 310, and fewer output machine commands 320), can improve the accuracy of the corresponding NLP model (e.g., fewer ambiguous voice command samples, more relevant samples), increase the processing speed of the NLP model (e.g., fewer templates, models, corpora), and save storage space due to reduced size of the NLP model.

In some embodiments, the above method of unselecting a subset of functions that are not commonly used, and updating the model can also be performed locally at the user device. In some embodiments, the method 700 further includes after integrating the first NLP model into the NLP model module at the voice control apparatus: establishing the data communication connection with the voice control apparatus; receiving a second user input to unselect a first subset of appliance functions from the first set of appliance functions for the first appliance type from the listing of appliance types and the respective listing of appliance functions for each appliance type displayed in the graphical user interface, wherein the first NLP model corresponding to the first set of appliance functions for the first appliance type has been integrated into the NLP module of the voice control apparatus; adjusting the first NLP model based on the removal of the first subset of appliance functions from the first set of appliance functions for the first appliance type; and integrating the adjusted first NLP model into the NLP module of the voice control apparatus. In some embodiments, the adjusted first NLP model is trained by voice command samples corresponding to the remaining appliance functions, and the effect of the training based on voice command samples for the deleted appliance functions are removed from the adjusted NLP model.

In some embodiments, the method 700 further includes after integrating the first NLP model into the NLP model module at the voice control apparatus: establishing the data communication connection with the voice control apparatus; detecting updates to one or more functions to the first set of appliance functions for the first appliance type; and presenting a prompt, on the display, for updating the first NLP model in accordance with user selection of one or more functions of the detected updates. In some embodiments, the functions of the first appliance are already updated at the first appliance by the first appliance itself connected to the manufacturer server.

Figure 8F:
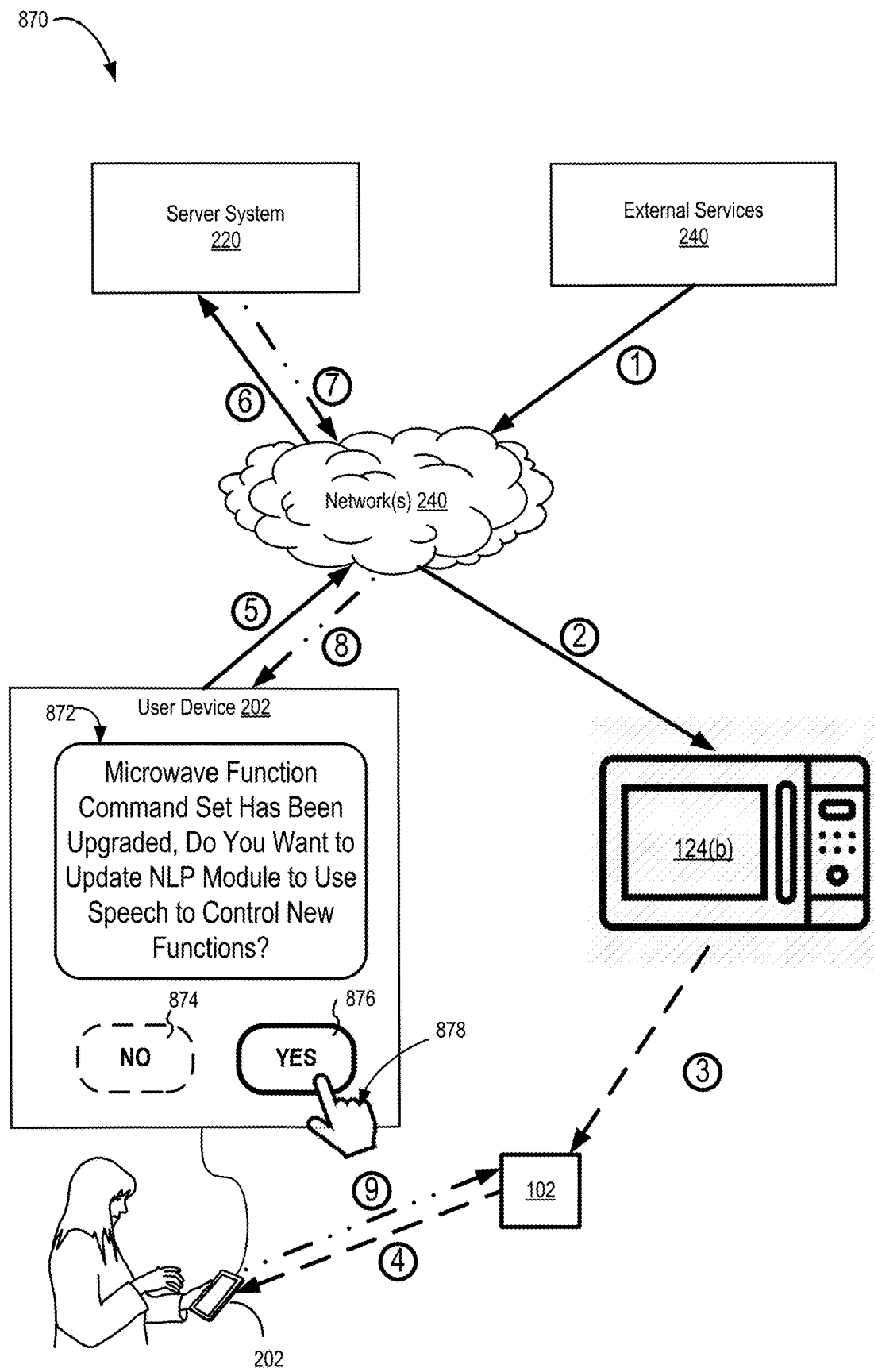
Figure 8G:
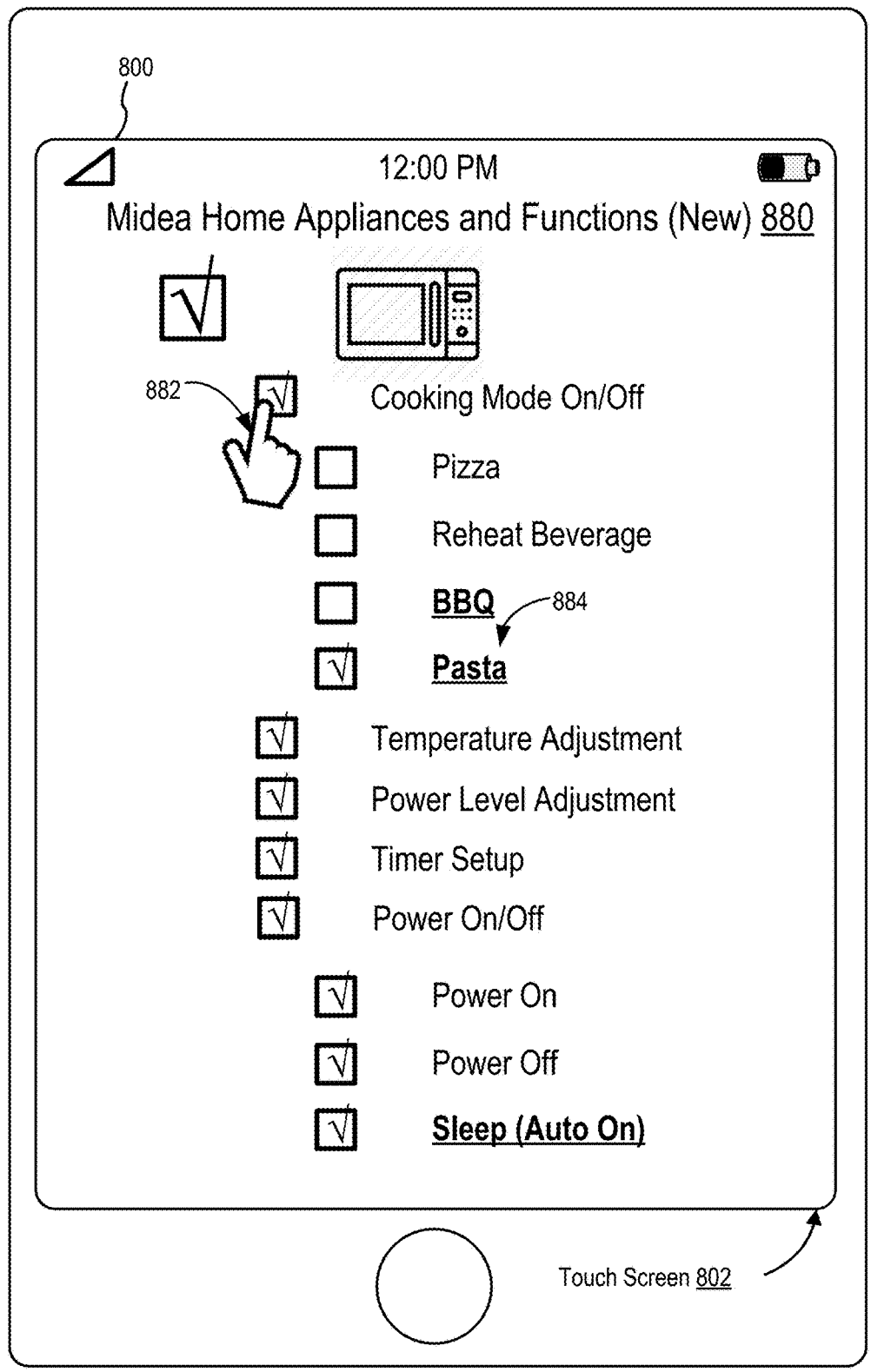

In some embodiments as shown in FIG. 8F, an appliance (e.g., microwave oven 124(b), FIG. 8F) that is capable of communicating with a manufacturer server (e.g., external services 240, FIG. 8F) via internet (e.g., networks 240, FIG. 8F) can periodically connects to the manufacturer server 240 or pinged by the manufacturer server 240 when there are updates to the appliance 124(b), such as software function upgrade, or hardware recall/adjustment, to update its functions (and a corresponding function list stored at the appliance). Once there is data communication established between this appliance 124(b) and the voice control apparatus 102, the voice control apparatus 102 receives a notification from the appliance 124(b) that there has been an update to the appliance's function list. In some embodiments, the voice control apparatus 102 updates its current NLP model registry 136 for the appliance 124(b) to indicate that an update to the language model may be needed. After the voice control apparatus 102 marks this update status, the voice control apparatus 102 reports this update to the user device 202 next time there is data communication established between the voice control apparatus 102 and the user device 202. In some embodiments, after detecting there is function updates to a particular appliance, the voice control apparatus 102 actively searches for the user device (e.g., when the remaining battery level allows) and notifies the user device of such updates. When the data communication is established between the voice control apparatus 102 and the user device 202, the user device checks the NLP registry 136 or a function list of the above upgraded appliance stored at the voice control apparatus 102 and detects that there is an update to the functions of the appliance. The user device 202 then displays a message (e.g., message 872, FIG. 8F) prompt on the GUI 800 to ask the user whether the corresponding NLP model 132 for the appliance 124(b) should be updated (e.g., "microwave functions have been updated, do you want to update the NLP module to enable voice control of these new functions?"). The user device 202 may then display only the upgraded functions of the appliance (e.g., the microwave), or the upgraded functions included/integrated in a list 880 (FIG. 8G) of all functions associated with the appliance (e.g., user can select to expand the function list, FIG. 8G), for user selection to update the NLP model of the appliance 124(b) accordingly. In some embodiments, this is a way to notify the user of function upgrade to an appliance (via an initial connection between the appliance 124(b) and the voice control apparatus 102, and then a connection between the voice control apparatus 102 and the user device 202) and provides selections to the user to update the NLP model(s) 132 of corresponding appliance based on the user's preference to accommodate voice control of the upgraded functions (e.g., the bold underlined functions listed in FIG. 8G). In some examples, certain function upgrades may not be necessary to the user (e.g., the new function to cook BBQ dish using microwave is not selected by the user, FIG. 8G), thus the user may choose not to include one or more subsets of functions of the corresponding NLP model(s) on the voice control apparatus to avoid overburdening the voice control apparatus. On the other hand, the user may be interested in using voice command to control the new function of the microwave oven to cook pasta. Thus the user checks the box for the Pasta on the user interface, and the NLP model corresponding to the microwave oven will be updated to exclude functions related to cooking BBQ, but include functions related to cooking pasta using the microwave oven.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 700 described above.

Figure 9A:
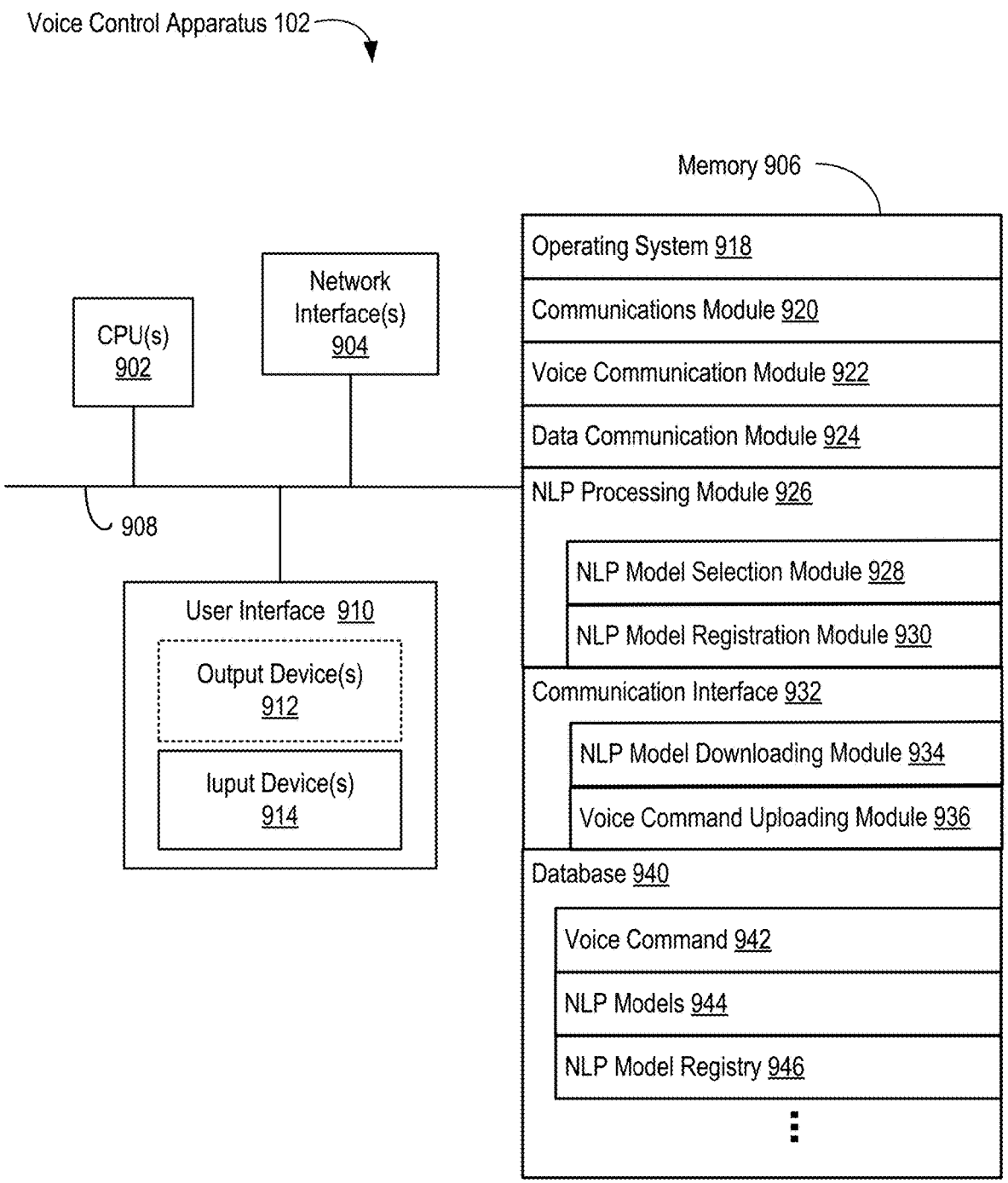
FIG. 9A is a block diagram illustrating a voice control apparatus for controlling multiple type of appliances in accordance with some embodiments.

FIG. 9A is a block diagram illustrating a voice control apparatus 102. The voice control apparatus 102 includes one or more processing units (CPUs) 902, one or more network interfaces 904, memory 906, and one or more communication buses 908 for interconnecting these components (sometimes called a chipset). Voice control apparatus 102 also includes a user interface 910. User interface 910 optionally includes one or more output devices 912 that enable presentation of media content, including one or more speakers and/or one or more visual displays. In some embodiments, the voice control apparatus 102 does not include any output devices. User interface 910 also includes one or more input devices 914, including a voice-command input unit or microphone. In some embodiments, the voice control apparatus 102 does not include a touch screen display, a touch-sensitive input pad, or a gesture capturing camera, or other input buttons or controls. In some embodiments, the voice control apparatus 102 includes memory 906. Memory 906 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 902. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

operating system 918 including procedures for handling various basic system services and for performing hardware dependent tasks;

network communication module 920 for connecting voice control apparatus 102 to other computing devices (e.g., a server system 220) or user device 202 (e.g., smart phones or tablets) connected to one or more networks via one or more network interfaces 904 (wired or wireless);

voice communication module 922 for accepting voice inputs from a user;

data communication module 924 for establishing data communication with multiple types of appliances configured to respond to distinct sets of machine commands to perform their respective appliance operations;

NLP processing module 926 for processing voice inputs from the user to obtain machine command to control a corresponding appliance, the NLP processing module 926 including:
  NLP model selection module 928 for selecting NLP model for a target appliance; and
  NLP model registration module 930 for recording relationship between NLP models and respective appliances;

communication interface 932 for establishing data communications between the voice control apparatus 102 and the user device 202, including:
  NLP model downloading module 934 for downloading NLP models from the server system 220; and
  voice command uploading module 936 for uploading voice command data collected at the voice control apparatus for updating NLP models;

databases 940, including:
  voice command 942 collected from the user controlling appliances;
  NLP models 944 (e.g., NLP models 132, FIG. 1); and
  NLP model registry 946 (e.g., NLP model registry 136, FIG. 1).

Figure 9B:
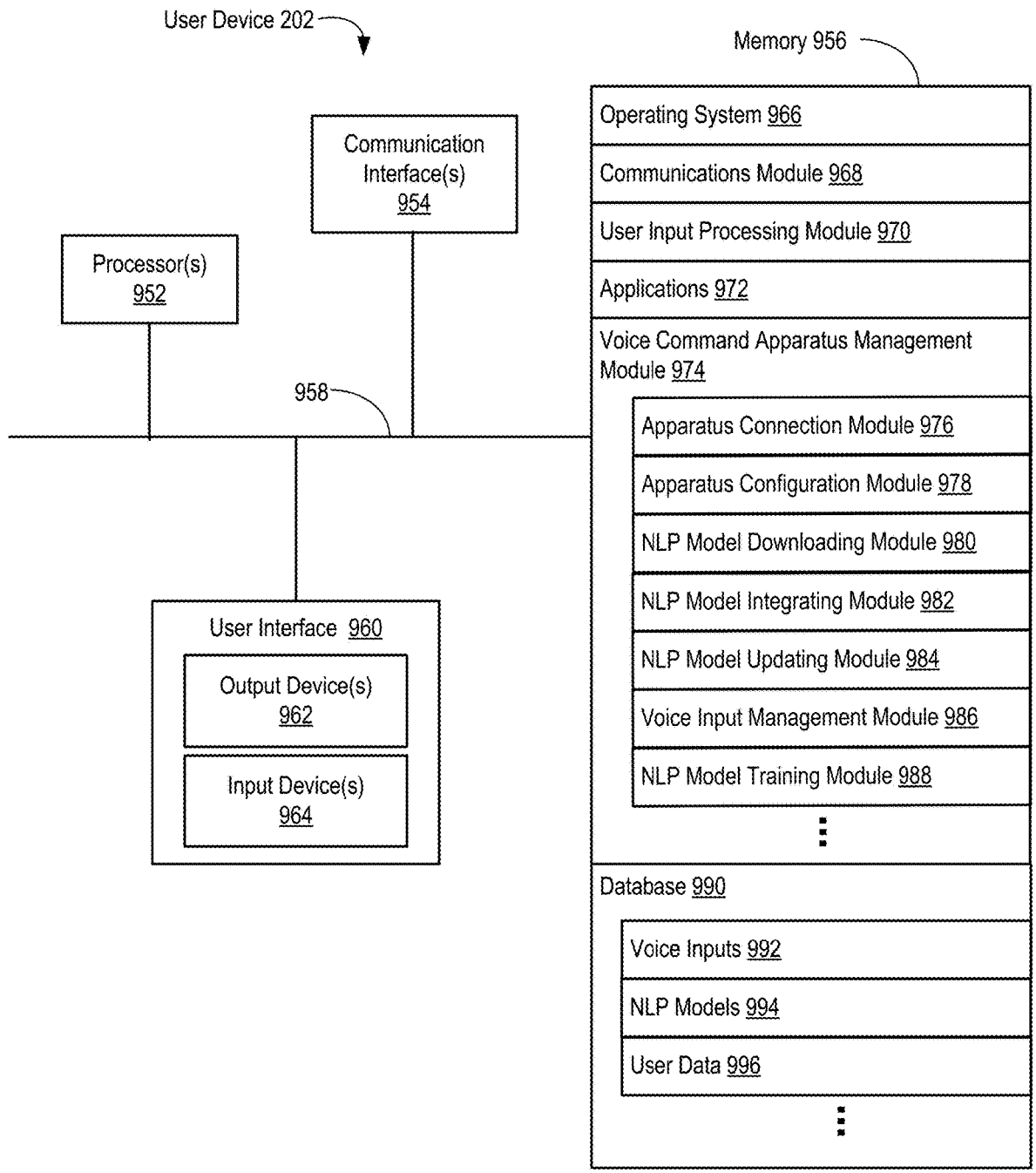
FIG. 9B is a block diagram illustrating a user device for customizing a voice control apparatus for multiple types of appliances in accordance with some embodiments.

FIG. 9B is a block diagram illustrating a representative user device 202 in accordance with some embodiments. User device 202, typically, includes one or more processing units (CPUs) 952 (e.g., processors), one or more network interfaces 954, memory 956, and one or more communication buses 958 for interconnecting these components (sometimes called a chipset). User device 202 also includes a user interface 960. User interface 960 includes one or more output devices 962 that enable presentation of media content, including one or more speakers and/or one or more visual displays. User interface 960 also includes one or more input devices 964, including user interface components that facilitate user input such as a keyboard, a mouse, a voice-command input unit or microphone, a touch screen display, a touch-sensitive input pad, a gesture capturing camera, one or more cameras, depth camera, or other input buttons or controls. Furthermore, some user devices 202 use a microphone and voice recognition or a camera and gesture recognition to supplement or replace the keyboard. In some embodiments, user device 202 further includes sensors, which provide context information as to the current state of user device 202 or the environmental conditions associated with user device 202. Sensors include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 956 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid-state storage devices. Memory 956, optionally, includes one or more storage devices remotely located from one or more processing units 952. Memory 956, or alternatively the non-volatile memory within memory 956, includes a non-transitory computer readable storage medium. In some implementations, memory 956, or the non-transitory computer readable storage medium of memory 956, stores the following programs, modules, and data structures, or a subset or superset thereof:

operating system 966 including procedures for handling various basic system services and for performing hardware dependent tasks;

communication module 968 for connecting user device 202 to other computing devices (e.g., server system 220) connected to one or more networks 240 via one or more network interfaces 954 (wired or wireless);

user input processing module 970 for detecting one or more user inputs or interactions from one of the one or more input devices 964 and interpreting the detected input or interaction;

one or more applications 974 for execution by user device 202 (e.g., payment platforms, media player, and/or other web or non-web based applications);

client-side modules including voice command apparatus management module 974, including but not limited to:
  apparatus connection 976 for establishing data connections with the voice control apparatus 102;
  apparatus configuration module 978 for performing initial configuration to the voice control apparatus 102;
  NLP model downloading module 980 for downloading one or more NLP models according to the user's selection from the server system 220;
  NLP model integrating module 982 for integrating the downloaded NLP models to the NLP module 130 of the voice control apparatus 102;
  NLP model updating module 984 for updating (e.g., customizing) NLP models in accordance with user's voice command collected in the voice control apparatus 102;
  voice input management module 986 for retrieving the user's voice command data for controlling one or more appliances from the voice control apparatus 102;
  NLP model training module 988 for training NLP models; and
  other modules for performing other functions set forth herein; and client-side database 990, storing data and models, including but not limited to:
  voice inputs 992;
  NLP models 994; and
  user data 996 (e.g., customer name, age, income level, color preference, previously purchased product, product category, product combination/bundle, previous inquired product, past delivery location, interaction channel, location of interaction, purchase time, delivery time, special requests, identity data, demographic data, social relationships, social network account names, social network publication or comments, interaction records with sales representatives, customer service representatives, or delivery personnel, preferences, dislikes, sentiment, beliefs, superstitions, personality, temperament, interaction style, etc.).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing a portable voice-based control user interface for multiple types of appliances, comprising:
   at a voice control apparatus having one or more processors, memory, a built-in data communication interface that is configured to establish data communication with multiple types of appliances configured to respond to distinct sets of machine commands to perform their respective appliance, a built-in voice communication interface that is configured to accept voice-based inputs from a user, and a built-in natural-language processing (NLP) module stored in the memory of the voice control apparatus, wherein the NLP module includes a respective NLP model for each of the multiple types of appliances:
      detecting a user request to activate the built-in voice communication interface of the voice control apparatus;
      in response to detecting the user request to activate the built-in voice communication interface of the voice control apparatus:
         activating the built-in voice communication interface of the voice control apparatus; and
         in accordance with one or more target selection criteria, selecting a first target appliance for one or more voice-based commands that are to be received through the built-in voice communication interface of the voice control apparatus;
      while the built-in voice communication interface remains activated and a current selection of the first target appliance remains unchanged, receiving a first voice input through the built-in voice communication interface of the voice control apparatus;
      in response to receiving the first voice input:
         in accordance with a determination that the first target appliance is a first appliance of a first appliance type, processing the first voice input using a first NLP model of the built-in NLP module that corresponds to the first appliance type to obtain a first machine command, and sending, via the built-in data communication interface, the first machine command to the first appliance; and
         in accordance with a determination that the first target appliance is a second appliance of a second appliance type that is distinct from the first appliance type, processing the first voice input using a second NLP model of the built-in NLP module that corresponds to the second appliance type to obtain a second machine command, and sending, via the built-in data communication interface, the second machine command to the second appliance.

2. The method of claim 1, wherein detecting the user request to activate the built-in voice communication interface comprises:
   detecting that the voice control apparatus is physically coupled to an appliance of a respective type of the multiple types of appliances, and wherein the one or more target selection criteria require that the appliance is selected as the first target appliance in accordance with a determination that the voice control apparatus is physically coupled to the appliance.

3. The method of claim 1, wherein:
   detecting the user request to activate the built-in voice communication interface comprises:
      detecting a user interaction with a predefined portion of the voice control apparatus; and
   the method further comprises:
      selecting the first target appliance for one or more voice-based commands that are to be received through the built-in voice communication interface of the voice control apparatus in accordance with determining that the predefined portion of the voice control apparatus is preassigned to be associated with the first target appliance.

4. The method of claim 1, wherein:
   detecting the user request to activate the built-in voice communication interface comprises:
      detecting a predefined orientational state of the voice control apparatus; and
   the method further comprises:
      selecting the first target appliance for one or more voice-based commands that are to be received through the built-in voice communication interface of the voice control apparatus in accordance with determining that the predefined orientational state of the voice control apparatus is preassigned to be associated with the first target appliance.

5. The method of claim 1, wherein:
   detecting the user request to activate the built-in voice communication interface comprises:
      detecting that the voice control apparatus has been brought within a threshold distance of an appliance of a respective one of the multiple types of appliances; and
   the method further comprises:
      selecting the first target appliance for one or more voice-based commands that are to be received through the built-in voice communication interface of the voice control apparatus in accordance with detecting that the voice control apparatus is within the threshold distance of the first target appliance.

6. The method of claim 1, further comprising:
   activating, in response to detecting the user request to activate the built-in voice communication interface of the voice control apparatus, the built-in data communication interface configured to transmit machine commands to one or more appliances of the multiple types of appliances; and
   selecting the first target appliance for one or more voice-based commands that are to be received through the built-in voice communication interface of the voice control apparatus in accordance with receiving a message including an appliance type identifier identifying the appliance type of the first target appliance via the activated built-in data communication interface.

7. The method of claim 1, wherein before detecting the user request to activate the built-in voice communication interface, the built-in voice communication interface of the voice control apparatus is inactive.

8. The method of claim 1, further comprising:
after activating the built-in voice communication interface, keeping the built-in voice communication interface active for a predetermined period of time.

9. The method of claim 1, wherein the built-in data communication interface corresponds to a wireless communication protocol selected from the group consisting of:
Bluetooth, Wireless Fidelity (Wi-Fi), near-field communication (NFC), ZigBee, ultrasound, acoustics, and magnetic resonance.

10. The method of claim 1, further comprising:
prior to receiving the first voice input, obtaining and installing a plurality of NLP models in the built-in NLP module in accordance with user selections of a plurality sets of appliance functions for a plurality of appliance types respectively, wherein each NLP model corresponds to a respective set of appliance functions for a respective appliance type.

11. The method of claim 1, further comprising: after selecting the first target appliance in accordance with the one or more target selection criteria, establishing a first wireless data communication with the first target appliance.

12. The method of claim 11, further comprising:
detecting a second user request to switch from the first target appliance to a second target appliance to be controlled by the user using one or more voice-based commands though the built-in voice communication interface of the voice control apparatus; and
in response to detecting the second user request:
selecting the second target appliance for one or more voice-based commands that are to be received through the built-in voice communication interface;
deactivating the first data communication with the first target appliance; and
establishing a second data communication to transmit machine commands to the second target appliance.

13. The method of claim 1, wherein selecting the first target appliance further comprises:
determining whether the built-in NLP module stores an NLP model corresponding to the appliance type of the first target appliance;
in accordance with a determination that the built-in NLP module stores a NLP model corresponding to the appliance type of the first target appliance, selecting the NLP model corresponding to the appliance type of the first target appliance; and
in accordance with a determination that the built-in NLP module does not store the NLP model corresponding to the appliance type of the first target appliance, returning an error message to the first target appliance.

14. The method of claim 1, wherein the voice control apparatus further comprises a battery, and wherein the method further comprises: charging the battery of the voice control apparatus by the first target appliance via the built-in data communication interface in response to establishing data communication with the first target appliance.

15. The method of claim 14, further comprising:
in response to starting to charge the battery of the voice control apparatus, searching for a user device by broadcasting data communication request messages, wherein the user device is configured to communicate with an NLP model server that trains a plurality of NLP models including the first NLP model and the second NLP model.

16. The method of claim 1, further comprising:
collecting voice data from one or more voice inputs of the user associated with managing one or more appliances respectively; and
in accordance with a determination that the voice control apparatus has established a data communication connection with a user device that is capable of communicating with an NLP model server configured to train a plurality of NLP models including the first NLP model and the second NLP model, sending the collected voice data to the user device for forwarding to the NLP model server to update one or more NLP models corresponding to the one or more appliances of one or more appliance types respectively.

17. The method of claim 16, further comprising:
deleting the collected voice data from the voice control apparatus after a predetermined time period from uploading the collected voice data to the user device.

18. The method of claim 16, further comprising:
deleting the collected voice data from the voice control apparatus after a predetermined time period from collecting the voice data.

19. A voice control apparatus configured to provide a portable voice-based control user interface for multiple types of appliances, comprising:
a built-in voice communication interface configured to accept voice-based inputs from a user,
a built-in data communication interface configured to establish data communication with multiple types of appliances configured to respond to distinct sets of machine commands to perform their respective appliance operations,
a built-in natural-language processing (NLP) module stored in memory of the voice control apparatus, wherein the NLP module includes a respective NLP model for each of the multiple types of appliances,
one or more processors, and
memory storing instruction, the instructions, when executed by the one or more processors, cause the processors to perform operations comprising:
detecting a user request to activate the built-in voice communication interface of the voice control apparatus;
in response to detecting the user request to activate the built-in voice communication interface of the voice control apparatus:
activating the built-in voice communication interface of the voice control apparatus; and
in accordance with one or more target selection criteria, selecting a first target appliance for one or more voice-based commands that are to be received through the built-in voice communication interface of the voice control apparatus;
while the built-in voice communication interface remains activated and a current selection of the first target appliance remains unchanged, receiving a first voice input through the built-in voice communication interface of the voice control apparatus; and
in response to receiving the first voice input:
in accordance with a determination that the first target appliance is of a first appliance of a first appliance type, processing the first voice input using a first NLP model of the built-in NLP module that corresponds to the first appliance type to obtain a first machine command, and sending, via the built-in data communication interface, the first machine command to the first appliance; and in accordance with a determination that the first target appliance is of a second appliance of a second appliance type that is distinct from the first appliance type, processing the first voice input using a second NLP model of the built-in NLP module that corresponds to the second appliance type to obtain a second machine command, and sending, via the built-in data communication interface, the second machine command to the second appliance.

20. A non-transitory computer-readable storage medium storing instructions, the instructions, when executed by one or more processors of a voice control apparatus, cause the processors to perform operations comprising:

detecting a user request to activate a built-in voice communication interface of the voice control apparatus that is configured to accept voice-based inputs from a user, wherein the voice control apparatus further includes a built-in data communication interface that is configured to establish data communication with multiple types of appliances configured to respond to distinct sets of machine commands to perform their respective appliance operations and a built-in natural-language processing (NLP) module stored in memory of the voice control apparatus, wherein the NLP module includes a respective NLP model for each of the multiple types of appliances;

in response to detecting the user request to activate the built-in voice communication interface of the voice control apparatus:

activating the built-in voice communication interface of the voice control apparatus; and in accordance with one or more target selection criteria, selecting a first target appliance for one or more voice-based commands that are to be received through the built-in voice communication interface of the voice control apparatus;

while the built-in voice communication interface remains activated and a current selection of the first target appliance remains unchanged, receiving a first voice input through the built-in voice communication interface of the voice control apparatus; in response to receiving the first voice input:

in accordance with a determination that the first target appliance is of a first appliance of a first appliance type, processing the first voice input using a first NLP model of the built-in NLP module that corresponds to the first appliance type to obtain a first machine command, and sending, via the built-in data communication interface, the first machine command to the first appliance; and in accordance with a determination that the first target appliance is of a second appliance of a second appliance type that is distinct from the first appliance type, processing the first voice input using a second NLP model of the built-in NLP module that corresponds to the second appliance type to obtain a second machine command, and sending, via the built-in data communication interface, the second machine command to the second appliance.

* * * * *